United States Patent
Saotome et al.

(10) Patent No.: US 12,253,658 B2
(45) Date of Patent: Mar. 18, 2025

(54) IMAGING LENS AND IMAGING APPARATUS

(71) Applicant: KYOCERA CORPORATION, Kyoto (JP)

(72) Inventors: Takashi Saotome, Kyoto (JP); Daisuke Kanai, Kyoto (JP); Takaharu Fujii, Kyoto (JP); Satoru Kihara, Kyoto (JP); Kousuke Sugiki, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 603 days.

(21) Appl. No.: 17/561,628

(22) Filed: Dec. 23, 2021

(65) Prior Publication Data
US 2022/0121017 A1    Apr. 21, 2022

Related U.S. Application Data

(63) Continuation of application No. PCT/JP2020/025089, filed on Jun. 25, 2020.

(30) Foreign Application Priority Data

Jun. 26, 2019  (JP) ................. 2019-119161

(51) Int. Cl.
*G02B 13/04* (2006.01)
*G02B 5/20* (2006.01)
(Continued)

(52) U.S. Cl.
CPC .............. *G02B 13/04* (2013.01); *G02B 9/10* (2013.01); *G02B 9/62* (2013.01); *G02B 13/0045* (2013.01); *G02B 5/208* (2013.01); *G02B 13/006* (2013.01)

(58) Field of Classification Search
CPC .............. G02B 13/0045; G02B 13/006; G02B 13/008; G02B 13/04; G02B 9/10;
(Continued)

(56) References Cited

U.S. PATENT DOCUMENTS

| 5,828,498 A | 10/1998 | Sekiya et al. |
| 8,526,128 B2 * | 9/2013 | Kubota ............ G02B 13/0045 359/794 |

(Continued)

FOREIGN PATENT DOCUMENTS

| JP | 200488181 A | 3/2004 |
| JP | 2010145828 A | 7/2010 |

(Continued)

*Primary Examiner* — Wyatt A Stoffa
*Assistant Examiner* — Samanvitha Sridhar
(74) *Attorney, Agent, or Firm* — HAUPTMAN HAM, LLP

(57) ABSTRACT

An imaging lens includes a front group having negative power, an aperture stop, and a rear group having positive power, in order from an object side. In the front group, a first lens surface has a convex shape toward the object side. In the rear group, a second lens surface has a convex shape toward the object side, a third lens surface has a convex shape toward the image side, and the third lens surface has an infrared ray cut coat. A curvature radius of the second lens surface is represented by Rr, a curvature radius of the third lens surface is represented by Re, a distance from the second lens surface to the third lens surface on an optical axis is represented by Da, and the following condition is satisfied: $1.6<(Rr+|Re|)/Da<2.3$.

7 Claims, 26 Drawing Sheets

(51) Int. Cl.
*G02B 9/10* (2006.01)
*G02B 9/62* (2006.01)
*G02B 13/00* (2006.01)

(58) Field of Classification Search
CPC . G02B 9/60; G02B 9/62; G02B 5/208; G02B 27/0018
USPC .................................................. 359/750–59
See application file for complete search history.

(56) References Cited

U.S. PATENT DOCUMENTS

| | | | |
|---|---|---|---|
| 9,207,430 B2* | 12/2015 | Ohashi | ............... G02B 27/0025 |
| 10,139,595 B1* | 11/2018 | Hudyma | ............... G02B 13/006 |
| 2011/0286112 A1 | 11/2011 | Orihara et al. | |
| 2013/0293772 A1 | 11/2013 | Kim | |
| 2014/0118849 A1 | 5/2014 | Mori | |
| 2014/0307329 A1 | 10/2014 | Katakura | |
| 2015/0109689 A1 | 4/2015 | Koizumi | |
| 2015/0260962 A1 | 9/2015 | Yamakawa | |
| 2018/0172961 A1* | 6/2018 | Wu | ........................ G02B 13/06 |
| 2019/0235210 A1* | 8/2019 | Nakai | .................. G02B 13/006 |
| 2020/0057280 A1 | 2/2020 | Kosuge | |

FOREIGN PATENT DOCUMENTS

| | | | | |
|---|---|---|---|---|
| JP | 20133267 A | | 1/2013 | |
| JP | 201373141 A | | 4/2013 | |
| JP | 20179973 A | | 1/2017 | |
| JP | 201966645 A | | 4/2019 | |
| JP | 2019066645 A | * | 4/2019 | ......... G02B 13/0045 |
| WO | 2011027622 A1 | | 3/2011 | |
| WO | 2013014913 A1 | | 1/2013 | |
| WO | 2014006842 A1 | | 1/2014 | |
| WO | 2014054407 A1 | | 4/2014 | |
| WO | 2018198943 A1 | | 11/2018 | |

* cited by examiner

Example 1

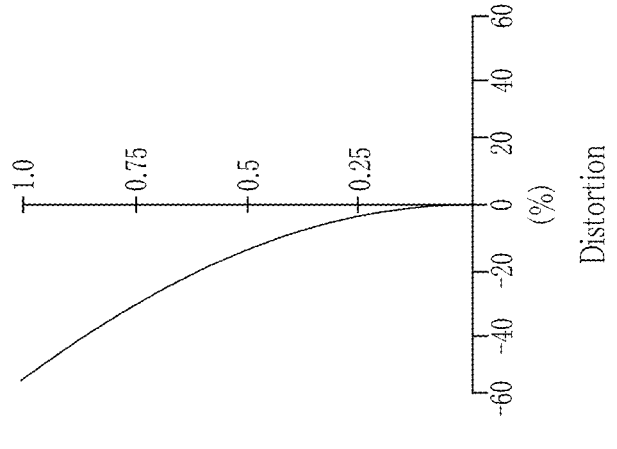
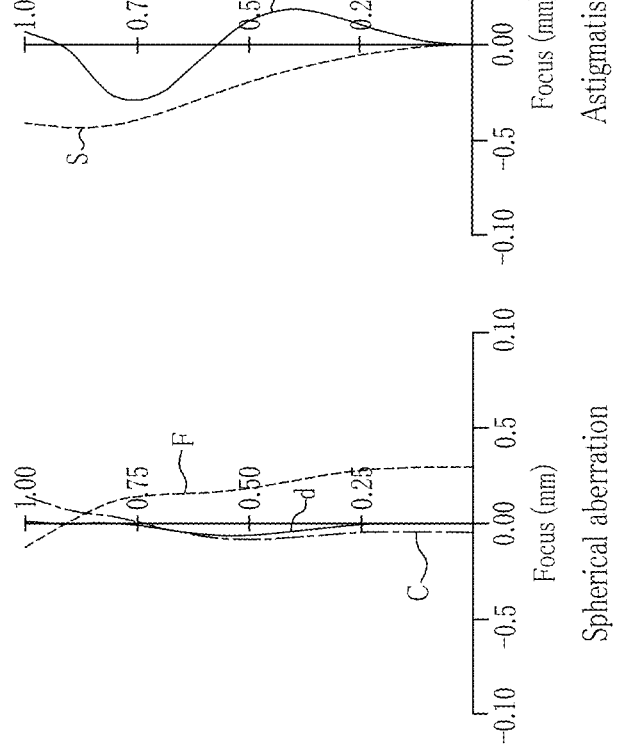

Example 1

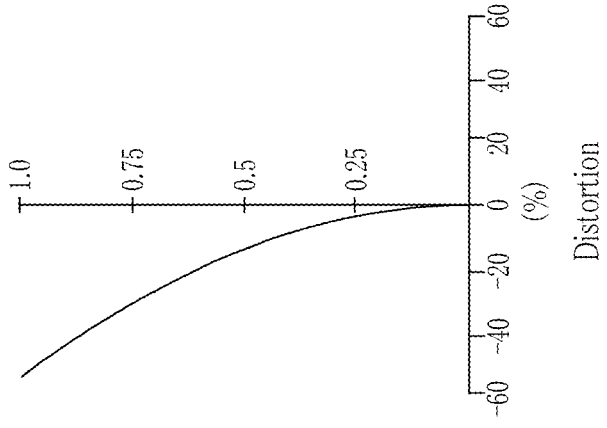
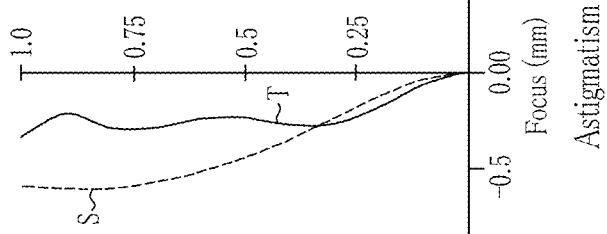
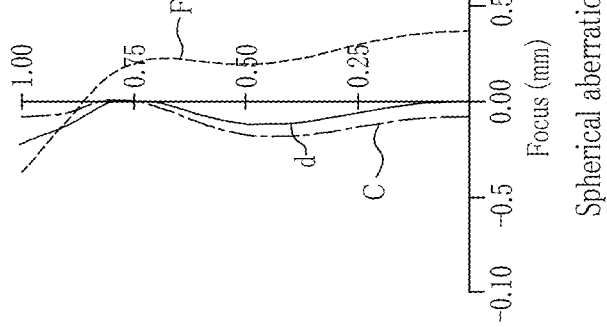

Example 2

Example 3

Example 3

Example 3

Example 3

Example 4

Example 4

Example 4

Example 4

Example 5

Example 5

Example 5

Example 5

FIG.17A Example 6

FIG.17B Example 6

FIG.17C Example 6

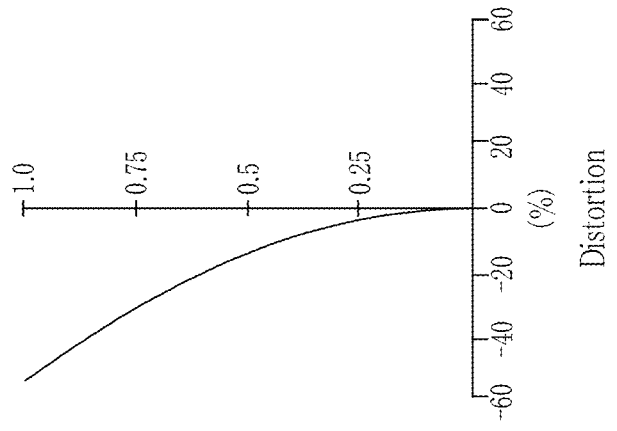
FIG.19A Example 7
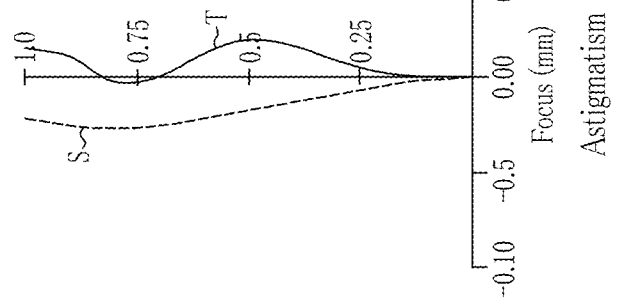
FIG.19B Example 7
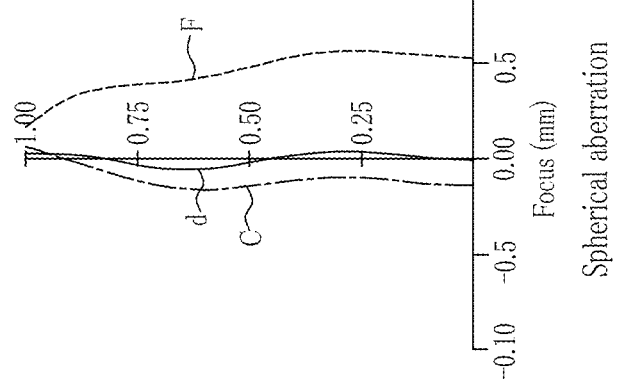
FIG.19C Example 7

Example 7

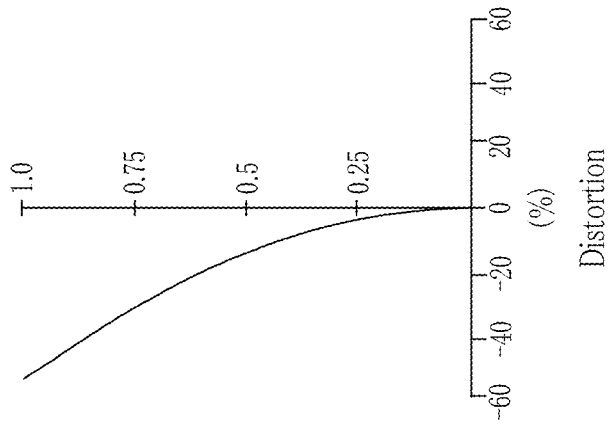
FIG.21C Example 8
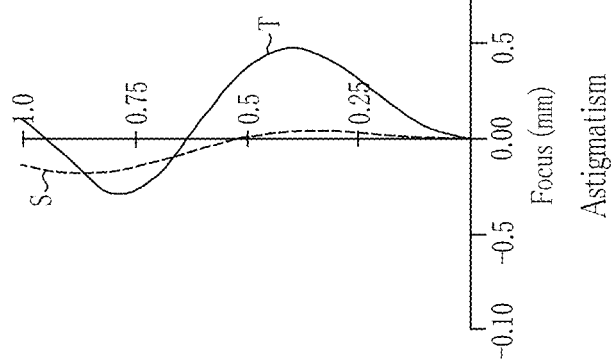
FIG.21B Example 8
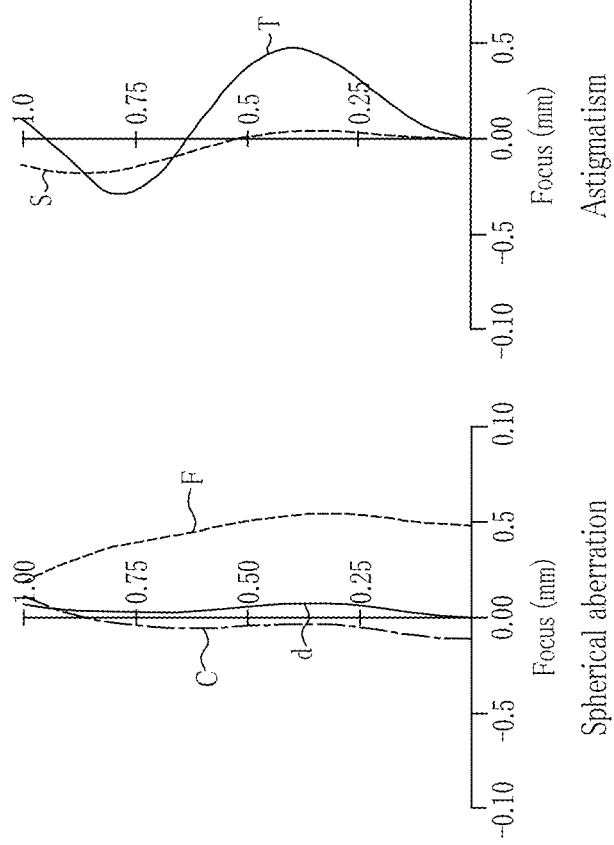
FIG.21A Example 8

Example 8

Example 9

Example 9

Example 9

Example 9

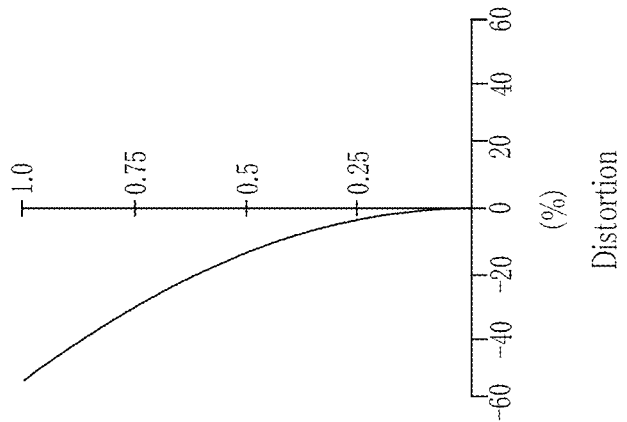
FIG.25A Example 10
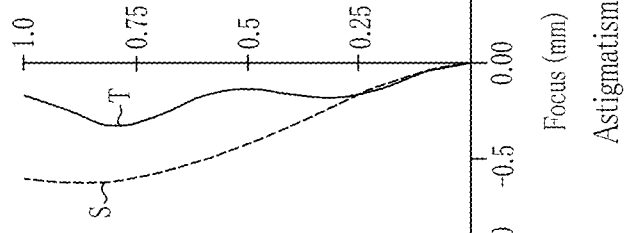
FIG.25B Example 10
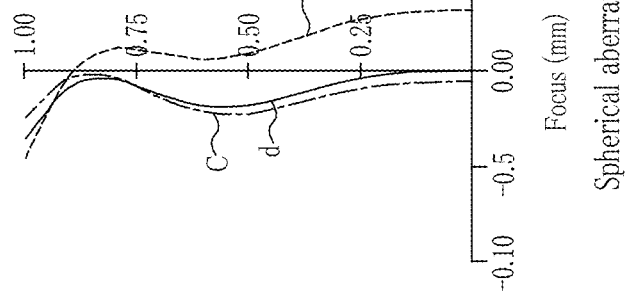
FIG.25C Example 10

Example 10

IMAGING LENS AND IMAGING APPARATUS

CROSS-REFERENCE TO RELATED APPLICATIONS

This application is a Continuation of PCT International Application No. PCT/JP2020/025089 filed on Jun. 25, 2020, which claims priority under 35 U.S.C 119(a) to Japanese Patent Application No. 2019-119161 filed on Jun. 26, 2019, which are hereby entirely incorporated by reference.

BACKGROUND OF THE INVENTION

1. Field of the Invention

This disclosure relates to an imaging lens and an imaging apparatus.

2. Description of the Related Art

In recent years, surveillance cameras, in-vehicle cameras and so on are in widespread use. With spread of an imaging lens for the surveillance cameras and in-vehicle cameras (referred to as the "in-vehicle cameras, etc."), a simpler configuration and higher performance are required. The performance of the in-vehicle cameras, etc. includes a wide angle of view, good image quality, no degradation in performance with temperature changes, and small size.

As an in-vehicle imaging lens, an imaging lens having 5 elements in 4 groups with a concave lens surface on the object side is disclosed (JP2010-145828A).

SUMMARY OF THE INVENTION

An imaging lens according to an embodiment comprises, in order from an object side, a front group having negative power, an aperture stop, and a rear group having positive power. In the front group, a first lens surface closest to the object side has a convex shape toward the object side. In the rear group, a second lens surface closest to the object side has a convex shape toward the object side, a third lens surface closest to an image side has a convex shape toward the image side, and the third lens surface has an infrared ray cut coat. And the imaging lens satisfies the following condition (1):

$$1.6 < (Rr + |Re|)/Da < 2.3. \quad (1)$$

In this condition, Rr represents a curvature radius of the second lens surface, Re represents a curvature radius of the third lens surface, and Da represents a distance from the second lens surface to the third lens surface on an optical axis.

BRIEF DESCRIPTION OF THE DRAWINGS

FIG. 7A is a graph which illustrates spherical aberration in Example 1.

FIG. 7B is a graph which illustrates astigmatism in Example 1.

FIG. 7C is a graph which illustrates distortion in Example 1.

FIG. 9A is a graph which illustrates spherical aberration in Example 2.

FIG. 9B is a graph which illustrates astigmatism in Example 2.

FIG. 9C is a graph which illustrates distortion in Example 2.

FIG. 19A is a graph which illustrates spherical aberration in Example 7.

FIG. 19B is a graph which illustrates astigmatism in Example 7.

FIG. 19C is a graph which illustrates distortion in Example 7.

FIG. 21A is a graph which illustrates spherical aberration in Example 8.

FIG. 21B is a graph which illustrates astigmatism in Example 8.

FIG. 21C is a graph which illustrates distortion in Example 8.

FIG. 25A is a graph which illustrates spherical aberration in Example 10.

FIG. 25B is a graph which illustrates astigmatism in Example 10.

FIG. 25C is a graph which illustrates distortion in Example 10.

DESCRIPTION OF THE PREFERRED EMBODIMENTS

Figure 1:
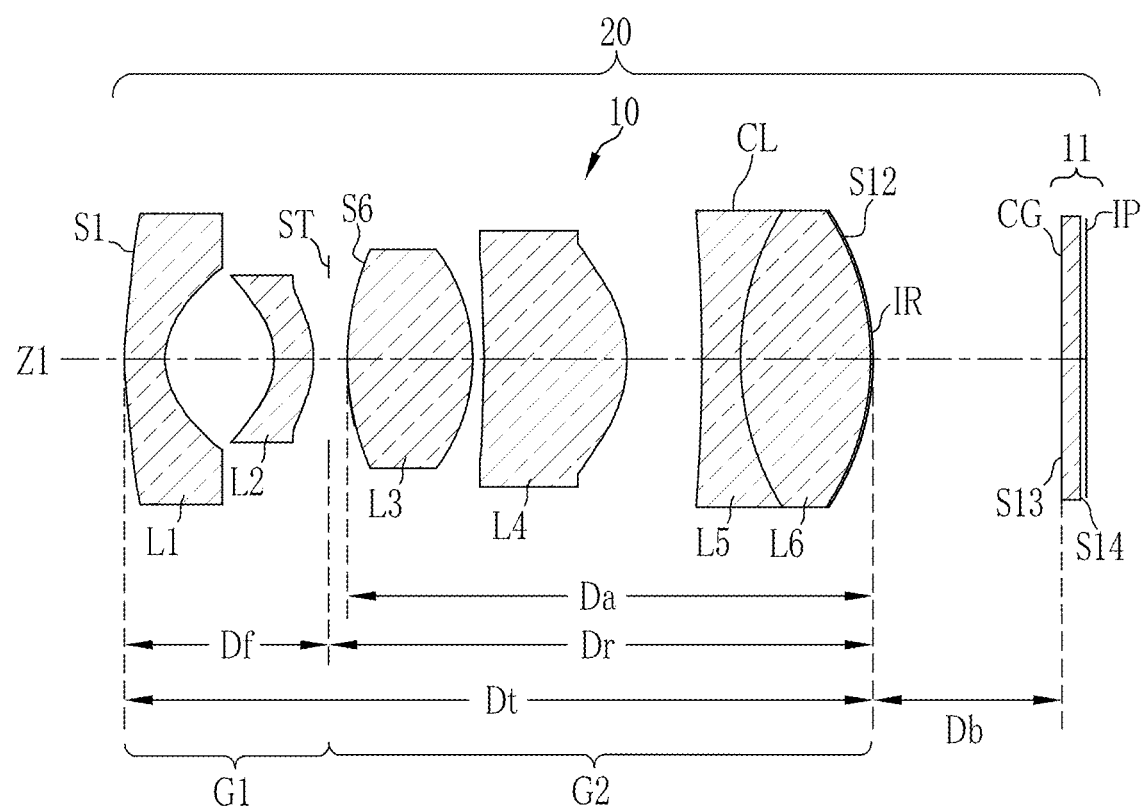
FIG. 1 is a cross-sectional view of an imaging lens and an imaging apparatus.

The in-vehicle cameras, etc. include a CCD (Charge Coupled Device), a CMOS (Complementary Metal-Oxide Semiconductor), or the like as an imaging element. The in-vehicle cameras, etc. are provided with a function of preventing unwanted light from entering the imaging element in order to prevent deterioration of image quality. Hereinafter, the imaging lens and the imaging apparatus of the present disclosure that suppress the deterioration of image quality with a simple configuration will be described.

An imaging lens according to this embodiment includes a front group having negative power, an aperture stop, and a rear group having positive power, in order from the object side. In the front group, a first lens surface closest to the object side has a convex shape toward the object side. In the rear group, a second lens surface closest to the object side has a convex shape toward the object side, a third lens surface closest to an image side has a convex shape toward the image side, and the third lens surface has an infrared ray cut coat. And the imaging lens satisfies the following condition (1):

$$1.6 < (Rr + |Re|)/Da < 2.3. \quad (1)$$

In this condition, Rr represents a curvature radius of the second lens surface, Re represents a curvature radius of the third lens surface, and Da represents a distance from the second lens surface to the third lens surface on an optical axis.

The front group includes a concave meniscus-shaped first lens having the first lens surface and a concave meniscus-shaped second lens in order from the object side. The second lens may be arranged with its convex surface facing the image side.

The rear group includes a third lens having the second lens surface, a fourth lens, and a cemented lens in order from the object side. The third lens, the fourth lens, and the cemented lens all may have positive power.

The cemented lens is composed of a fifth lens, which is a concave lens, and a sixth lens, which is a convex lens, in order from the object side. The sixth lens may have the third lens surface.

The following condition (2) may be satisfied.

$$1.20 \leq (R1 + |Re|)/Dt \leq 1.46. \quad (2)$$

In this condition, R1 represents a curvature radius of the first lens surface, Re represents the curvature radius of the third lens surface, and Dt represents a distance from the first lens surface to the third lens surface on the optical axis.

An imaging apparatus according to this embodiment includes any of the above imaging lenses and a flat plate-shaped cover glass.

The following condition (3) may be satisfied.

$$0.50 \leq R1/(Dt + Db) \leq 0.53. \quad (3)$$

In this condition, R1 represents the curvature radius of the first lens surface, Dt represents the distance from the first lens surface to the third lens surface on the optical axis, and Db represents the distance from the third lens surface to the object side of the cover glass on the optical axis.

The following condition (4) may be satisfied.

$$0.66 \leq Rr/(Da + Db) \leq 0.83. \quad (4)$$

In this condition, Rr represents the curvature radius of the second lens surface, Da represents the distance from the second lens surface to the third lens surface on the optical axis, and Db represents the distance from the third lens surface to the object side of the cover glass on the optical axis.

The following condition (5) may be satisfied.

$$2.28 \leq |Re|/Db \leq 2.88. \quad (5)$$

In this condition, Re represents the curvature radius of the third lens surface, and Db represents the distance from the third lens surface to the object side of the cover glass on the optical axis.

Hereinafter, the imaging lens and the imaging apparatus of the present disclosure will be described in detail.

For example, focusing on the infrared region, the imaging element has sensitivity also in the infrared region. Therefore, the quality of the image may deteriorate due to the infrared rays incident on the imaging element. In the in-vehicle cameras, etc., an infrared ray filter or an infrared ray cut coat on the lens, etc., is provided to prevent infrared rays from entering the imaging element (infrared ray cutting function), thereby preventing the deterioration of image quality caused by infrared rays.

However, in case that the infrared ray filter is used, the incident light from a particularly bright light source is partially reflected by the incident side of the infrared ray filter (the object side of the imaging lens). As this reflected light is re-reflected by for example the lens surface facing the infrared ray filter and is imaged on the light receiving surface of the imaging element, it becomes a so-called ghost image, which may cause the deterioration of image quality. In addition, in case of applying an infrared ray cut coating to a lens, etc., priority is generally given to the infrared ray cut performance, which may reduce the anti-reflection performance. Therefore, in the same way as in the case of the infrared ray filter, ghosting may occur in the lens coated with the infrared ray cut coat, for example, due to the reflected light from the lens surface of the lens coated with the infrared ray cut coat. In consideration of the above, one embodiment of the present disclosure has the following structure.

As shown in FIG. 1, an imaging apparatus 20 includes an imaging lens 10 and an image sensor 11. The image sensor 11 is equipped with a cover glass CG to protect an imaging plane IP. Therefore, the imaging lens 10 is a lens that images an object by forming an image of the object on the imaging plane IP through the cover glass CG.

The imaging lens 10 has a front group G1 with negative power, an aperture stop ST, and a rear group G2 with positive power, which are arranged along an optical axis Z1 in order from the object side. The imaging lens 10 is a retrofocus type wide-angle lens. The angle of view exceeds, for example, 100 degrees. The temperature environment for this lens is, for example, from about −40° C. to about 120° C.

In this embodiment, the front group G1 includes a first lens L1 and a second lens L2 in order from the object side. The rear group G2 includes a third lens L3, a fourth lens L4, a fifth lens L5, and a sixth lens L6 in order from the object side. The fifth lens L5 and the sixth lens L6 form a cemented lens CL. Therefore, the imaging lens 10 of this embodiment has 6 elements in 5 groups. In addition, the aperture stop ST is provided between the second lens L2 and the third lens L3. Each lens from the first lens L1 to the sixth lens L6 is formed using glass, for example.

In the front group G1, a first lens surface (surface S1) closest to the object side is convex toward the object side. In the rear group G2, a second lens surface (surface S6) closest to the object side is convex toward the object side. In the rear group G2, a third lens surface (surface S12) closest to the image side is convex toward the image side. In addition, in the rear group G2, the third lens surface (the surface S12) is equipped with an infrared ray cut coat IR. Note that the infrared ray cut coat IR, etc. are shown schematically in FIG. 1, and may differ from the actual dimensions.

In the surface S1, a convex shape on the object side may be formed so that the curvature radius of the central portion near the optical axis Z1 becomes smaller. By forming the lens in this way, it is possible to suppress ghosting caused by the surface S1 of the imaging lens 10, for example, ghosting caused by the reflected light of the incident light being re-reflected to the image side.

The curvature radius Rr of the surface S6, the absolute value |Re| of the curvature radius Re of the surface S12, and the distance Da from the surface S6 to the surface S12 on the optical axis satisfy the following condition (1).

$$1.6 < (Rr + |Re|)/Da < 2.3. \tag{1}$$

Figure 2:
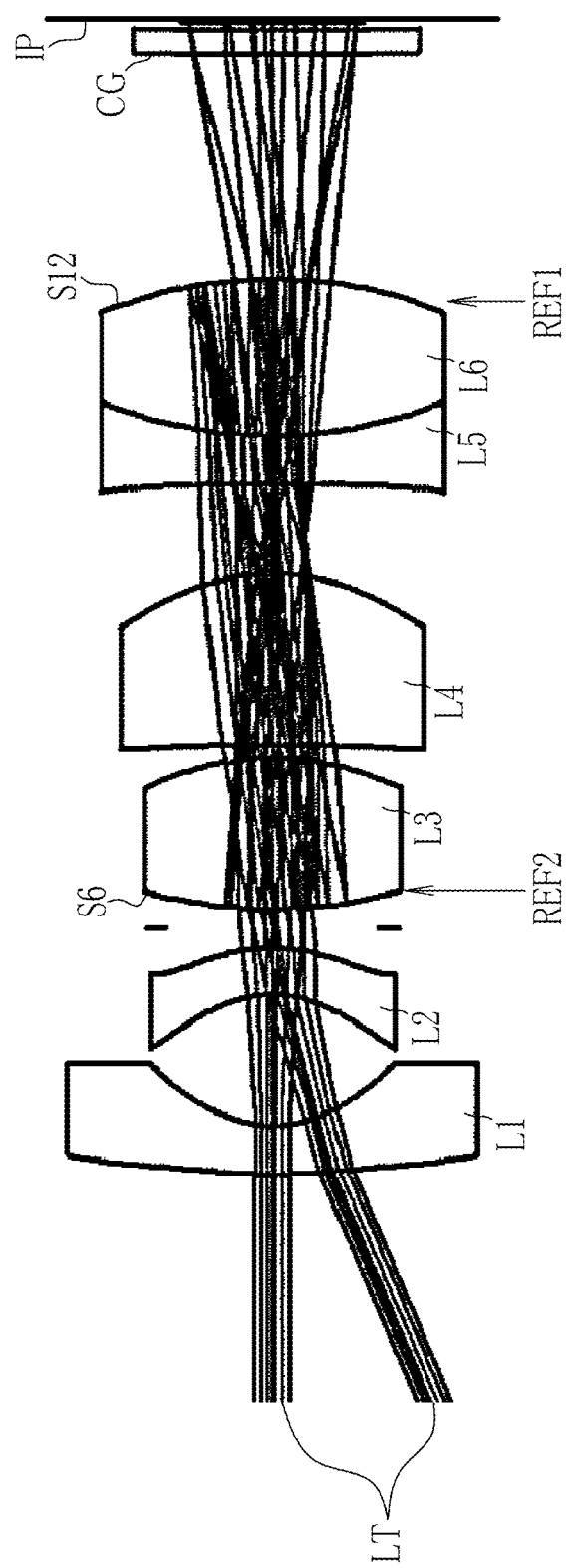
FIG. 2 is an explanatory view that illustrates a model of ghosting caused by re-reflection at a second lens surface (surface S6).
Figure 4:
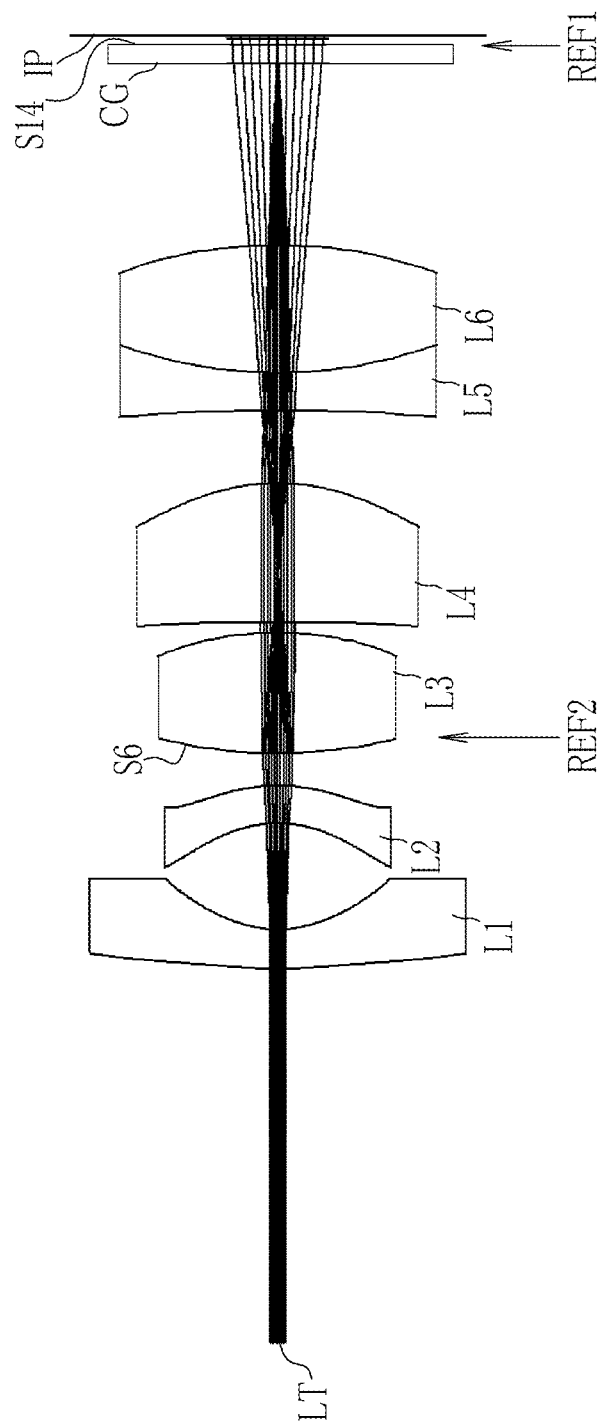
FIG. 4 is an explanatory view that illustrates a model of ghosting caused by re-reflection at a second lens surface (surface S6).

As shown in FIG. 2 and FIG. 4, by satisfying the condition (1), while maintaining the optical performance of the imaging lens 10, the reflected light is actively cross-diffused when the light (LT) reflected (REF1) from the surface S12 to the object side is re-reflected (REF2) by the surface S6 and focused on the imaging plane IP, thus the condensing diameter is expanded. Therefore, even if a ghost of a specific color, such as red, is generated due to reflected light on the surface S12 equipped with the infrared ray cut coat IR, the ghost image on the imaging plane IP is sufficiently reduced in luminance because the condensing diameter has been enlarged, thus suppressing any noticeable effect on image quality. In this embodiment, by satisfying the condition (1), for example, the luminance is weakened to about $1/10^7$ with respect to the incident light. As described above, the imaging lens 10 has an infrared ray cutting function and suppresses ghosting caused by reflected light with a simple configuration that does not require a separate element such as the infrared ray filter. In the condition (1), the lower limit value may be 1.7 instead of 1.6. In the condition (1), the lower limit value may be 1.8 instead of 1.6. In the condition (1), the upper limit value may be 2.1 instead of 2.3. In the condition (1), the upper limit value may be 2.0 instead of 2.3.

The curvature radius Rr of the surface S6 and the curvature radius Re of the surface S12 may satisfy the following condition (1a). In case that the condition (1a) is satisfied, the optical performance of the imaging lens 10 is better maintained and ghosting is suppressed.

$$-1.11 \leq Rr/Re \leq -0.90. \tag{1a}$$

The curvature radius Re of the surface S12 and the distance Da from the surface S6 to the surface S12 on the optical axis Z1 may satisfy the following condition (1b). In case that the condition (1b) is satisfied, the optical performance of the imaging lens 10 is better maintained and ghosting is suppressed.

$$-1.13 \leq Re/Da \leq -0.82. \tag{1b}$$

The curvature radius Rr of the surface S6 and the distance Da from the surface S6 to the surface S12 on the optical axis Z1 may satisfy the following condition (1c). In case that the condition (1c) is satisfied, the optical performance of the imaging lens 10 is better maintained and ghosting is suppressed.

$$0.90 \leq Rr/Da \leq 1.21. \tag{1c}$$

The focal length of the imaging lens 10, i.e., the focal length $f_{16}$ of the imaging lens 10 including the first lens L1, the second lens L2, the third lens L3, the fourth lens L4, the fifth lens L5, and the sixth lens L6, and the distance Dt from the surface S1 to the surface S12 on the optical axis may satisfy the following condition (1d). By satisfying the condition (1d), the imaging lens can have appropriate optical performance and can be made smaller.

$$3.93 \leq Dt/f_{16} \leq 4.56. \tag{1d}$$

As shown in FIG. 1, in this embodiment, the front group G1 includes the first lens L1 and the second lens L2 in order from the object side. The first lens L1 is a concave meniscus-shaped lens with a first lens surface (the surface S1). The second lens L2 is a concave meniscus-shaped lens. The lenses included in the front group G1 (the first lens L1 and the second lens L2) may be formed of, for example, a glass material having excellent durability so that it may be exposed to the installation environment.

The first lens L1 is an aspherical lens with negative power. For example, the first lens L1 has a positive value of about 3.6 ($10^{-6}$/° C.) for the temperature coefficient of relative refractive index dn/dt at 20 to 40° C. In this description, the temperature coefficient dn/dt is a value measured according to the Japan Optical Glass Manufacturers' Association standard, JOGIS J18-2008 "Measuring Method for Thermal Coefficient of Refractive Index of Optical Glass". In addition, the first lens L1 may suppress aberrations by setting a small curvature radius at the central portion near the optical axis Z1 and a relatively larger curvature radius at the periphery in the surface S1.

The second lens L2 is an aspherical lens with negative power. Therefore, by using the first lens L1 and the second lens L2, aberrations can be suppressed in the imaging lens 10, and high optical performance can be stably ensured over the entire angle of view.

The second lens L2 is arranged with its convex surface facing the image side. The two lenses, the first lens L1 and the second lens L2, are arranged in close proximity to the aperture stop ST. This allows the desired wide angle to be secured while keeping the effective diameter of the first lens L1 small. Further, the second lens L2 has a relatively large influence on MTF (Modulation Transfer Function) and aberration among the lenses constituting the imaging lens 10. Therefore, the second lens L2 contributes to the excellent optical performance of the imaging lens 10 as a whole. In addition, the second lens L2 formed with an aspherical surface is arranged just before the object side of the aperture stop ST. Thereby, the imaging lens 10 can prevent ghosting caused by the second lens L2.

The rear group includes the third lens L3, the fourth lens L4, and the cemented lens CL in order from the object side. The third lens L3 has the second lens surface (the surface S6). The cemented lens CL has the third lens surface (the surface S12). The surface S12 is equipped with the infrared ray cut coat IR. The third lens L3, the fourth lens L4, and the cemented lens CL all have positive power.

The third lens L3 is a spherical lens. The third lens L3 is formed using a material whose temperature coefficient dn/dt is a negative value. The third lens L3 has a negative value, for example, of about −5.6 ($10^{-6}$/° C.) for the temperature coefficient of relative refractive index dn/dt at 20 to 40° C. In addition, the third lens L3 has abnormal dispersibility. Furthermore, the third lens L3 has a relatively small focal length.

The fourth lens L4 is an aspherical lens. The fourth lens L4 is formed of a glass material which has a larger linear expansion coefficient as compared with other lens materials constituting the imaging lens 10, and has a negative temperature coefficient dn/dt. The fourth lens L has a negative value, for example, of about −8.5 ($10^{-6}$/° C.) for the temperature coefficient of relative refractive index dn/dt at 20 to 40° C. In addition, the fourth lens L4 has abnormal dispersibility. Furthermore, the fourth lens L4 has a relatively small focal length.

As described above, the third lens L3 and the fourth lens L4 have the function of temperature compensation for the imaging lens 10 as a whole. Thus, for example, the imaging lens 10 as a whole has a function of suppressing the amount of focus shift. Since the third lens L3 and the fourth lens L4 are used in combination, the curvature radius of the surface S6 which is the object side surface of the third lens L3, can be set in a controlled manner to highly suppress ghosting while maintaining the optical performance of the imaging lens 10. Thus, for example, ghosting due to re-reflection at the surface S6 of reflected light from the surface S12 which is the image side surface of the cemented lens CL equipped with the infrared ray cut coat IR, can be highly suppressed.

The cemented lens CL includes the fifth lens L5 and the sixth lens L6, in order from object side. The fifth lens L5 is a concave lens. The sixth lens L6 is a convex lens. The fifth lens L5 and the sixth lens L6 are spherical lenses. Since it is the cemented lens CL, the imaging lens 10 as a whole has a function of improving optical performance such as chromatic aberration correction. Further, by using the cemented lens CL, the eccentric sensitivity of the imaging lens 10 is lowered, so that the productivity is improved.

The sixth lens L6 has the third lens surface (the surface S12). The surface S12 has a convex shape toward the image side. The surface S12 is equipped with the infrared ray cut coat IR. The infrared ray cut coat IR is configured to transmit visible light and block transmission in the near infrared region such as 700 nm to 1200 nm. The infrared ray cut coat IR is, for example, a vapor deposition film, which can be formed by known methods. By adding the infrared ray prevention function to the lens in this way, the imaging lens 10 can be made smaller with a simple configuration.

In the cemented lens CL, the fifth lens may be a convex lens and the sixth lens may be a meniscus lens. In this case, the surface S12 is convex toward the image side, and the infrared ray cut coat IR is provided on the convex surface S12.

The focal length $f_{16}$ of the imaging lens 10 and the distance Da from the surface S6 to the surface S12 on the optical axis may satisfy the following condition (1e). In case that the condition (1e) is satisfied, the optical performance of the imaging lens 10 becomes better.

$$2.74 \leq Da/f_{16} \leq 3.30. \tag{1e}$$

The distance Df from the surface S1 to the aperture stop ST on the optical axis and the distance Dr from the aperture stop ST to the surface S12 on the optical axis may satisfy the following condition (1f). The condition (1f) defines the ratio between the total length of the front group and the total length of the rear group. In case that the condition (1f) is satisfied, the optical performance of the imaging lens 10 becomes better.

$$0.33 \leq Df/Dr \leq 0.42. \tag{1f}$$

Next, in this embodiment, a curvature radius R1 at the central portion of the surface S1 near the optical axis Z1, the absolute value |Re| of the curvature radius Re of the surface S12, and the distance Dt from the surface S1 to the surface S12 on the optical axis Z1 may satisfy the following condition (2).

$$1.20 \leq (R1 + |Re|)/Dt \leq 1.46. \tag{2}$$

Figure 3:
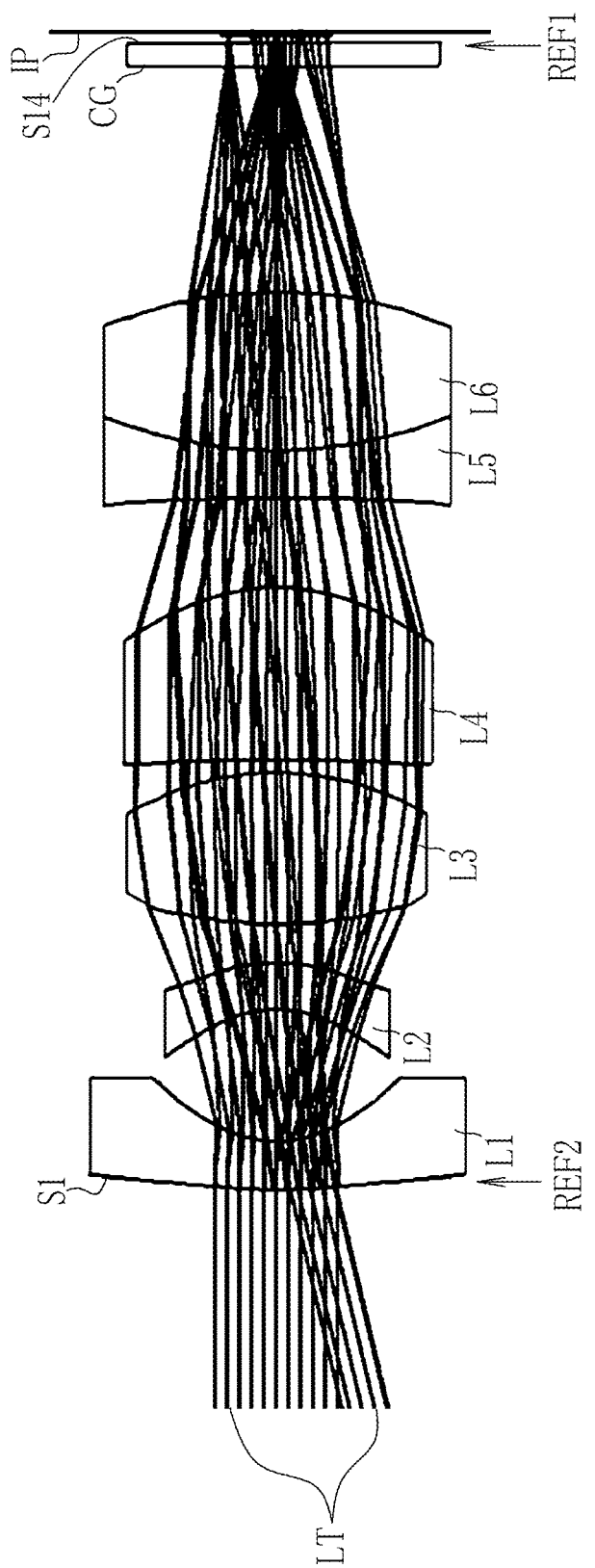
FIG. 3 is an explanatory view that illustrates a model of ghosting caused by re-reflection at a first lens surface (surface S1).

As shown in FIG. 3, satisfying the condition (2) prevents the light (LT) that is reflected (REF1) toward the object side at the surface S12 from being re-reflected (REF2) at the surface S1 and becoming ghosts, while maintaining the optical performance of the imaging lens 10. Therefore, by satisfying the condition (2), the imaging lens 10 has an infrared ray cutting function and suppresses ghosting caused by reflected light with a simple configuration that does not require a separate element such as the infrared ray filter. In the condition (2), the lower limit value may be 1.25 instead of 1.20. In the condition (2), the lower limit value may be 1.27 instead of 1.20. In the condition (2), the upper limit value may be 1.40 instead of 1.46. In the condition (2), the upper limit value may be 1.36 instead of 1.46.

Further, the curvature radius R1 at the central portion of the surface S1 near the optical axis Z1 and the curvature radius Re of the surface S12 may satisfy the following condition (2a). The condition (2a) defines the ratio of the curvature radius R1 to the curvature radius Re. In case that the condition (2a) is satisfied, the occurrence of ghosting is suppressed better while maintaining the optical performance of the imaging lens 10.

$$-1.04 \leq R1/Re \leq -0.89. \tag{2a}$$

As shown in FIG. 1, the imaging apparatus 20 includes the imaging lens 10 and the image sensor 11 in order from the object side. The image sensor 11 is equipped with the flat plate-shaped cover glass CG. The cover glass CG protects the imaging plane IP of the image sensor 11, and is arranged in the order of the cover glass CG and the imaging plane IP from the object side. Therefore, an object side surface S13 of the cover glass CG faces the surface S12.

In this embodiment, in the imaging apparatus 20, the curvature radius R1 at the central portion of the surface S1 near the optical axis Z1, the distance Dt from the surface S1 to the surface S12 on the optical axis Z1, and the distance Db from the surface S12 to the object side surface S13 of the cover glass CG on the optical axis Z1 may satisfy the following condition (3).

$$0.50 \leq R1/(Dt + Db) \leq 0.53. \quad (3)$$

By satisfying the condition (3), the reflected light that is reflected toward the object side at the surface S13 is prevented from being re-reflected at the surface S1 and becoming ghosts, while maintaining the optical performance of the imaging lens 10. Therefore, by satisfying the condition (3), ghosting caused by the cover glass is better suppressed in the imaging lens 10. The lower limit value of the condition (3) may be 0.51. The upper limit value of the condition (3) may be 0.52.

In this embodiment, in the imaging apparatus 20, the curvature radius Rr of the surface S6, the distance Da from the surface S6 to the surface S12 on the optical axis, and the distance Db from the surface S12 to the surface S13 on the optical axis may satisfy the following condition (4).

$$0.66 \leq Rr/(Da + Db) \leq 0.83. \quad (4)$$

By satisfying the condition (4), the reflected light that is reflected toward the object side at the surface S13 is prevented from being re-reflected at the surface S6 and becoming ghosts, while maintaining the optical performance of the imaging lens 10. Therefore, by satisfying the condition (4), ghosting caused by the cover glass is better suppressed in the imaging lens 10. The lower limit value of the condition (4) may be 0.68. The lower limit value of the condition (4) may be 0.70. The upper limit value of the condition (4) may be 0.74. The upper limit value of the condition (4) may be 0.72.

In this embodiment, in the imaging apparatus 20, the absolute value |Re| of the curvature radius Re of the surface S12 and the distance Db from the surface S12 to the surface S13 on the optical axis may satisfy the following condition (5).

$$2.28 \leq |Re|/Db \leq 2.88. \quad (5)$$

Figure 5:
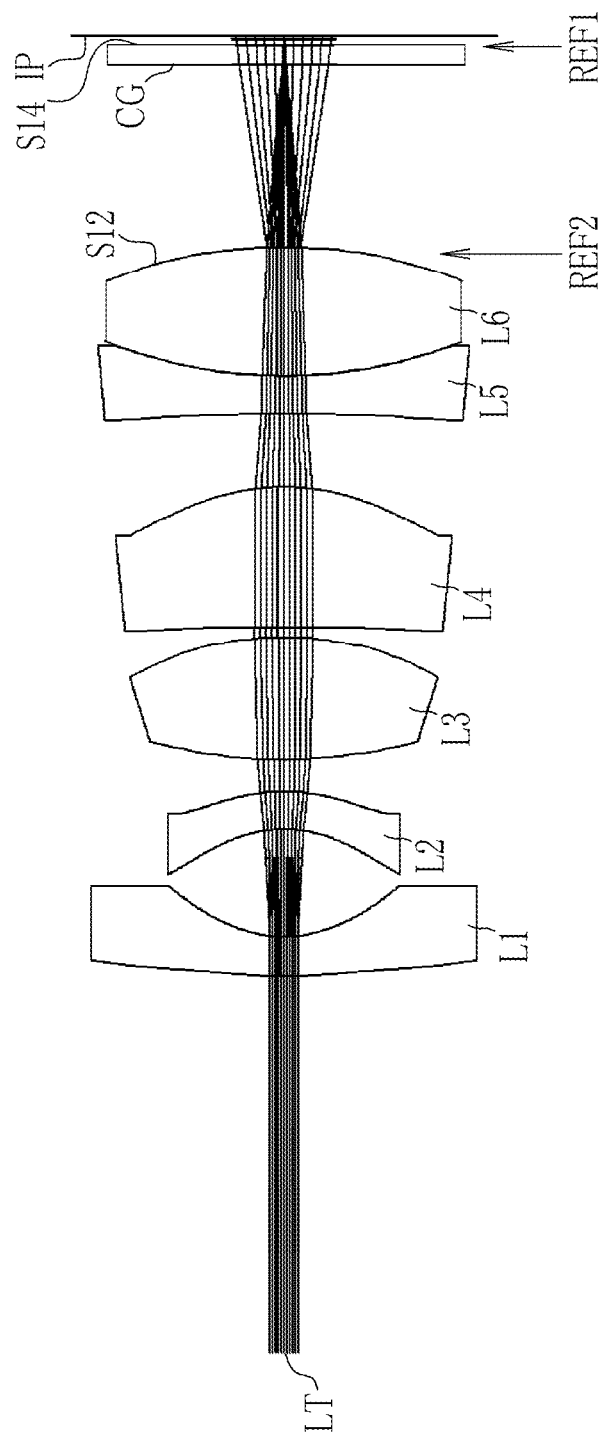
FIG. 5 is an explanatory view that illustrates a model of ghosting caused by re-reflection at a third lens surface (surface S12).

Depending on the relationship between the distance from the surface S12 to the surface S13 and the value of the curvature radius of the surface S12, ghosts may form around the imaging plane IP. However, by satisfying the condition (5), as shown in FIG. 5, the curvature radius Re of the surface S12 takes a constant value in relation to the distance Db from the surface S12 to the surface S13. This prevents ghosts from forming around the imaging plane IP. Therefore, ghosting caused by the cover glass CG or the surface S12 is better suppressed in the imaging lens 10. The lower limit value of the condition (5) may be 2.31. The lower limit value of the condition (5) may be 2.35. The upper limit value of the condition (5) may be 2.71. The upper limit value of the condition (5) may be 2.64.

EXAMPLES

Figure 6:
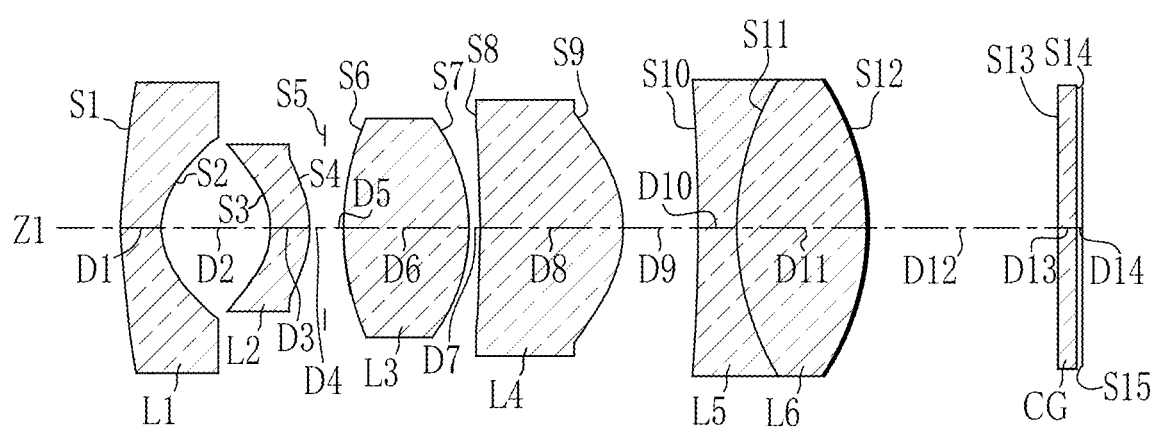
FIG. 6 is a cross-sectional view of an imaging lens of Example 1.

Examples of the imaging lens 10 will be described below. FIG. 6 is a cross-sectional view of the imaging lens 10 of Example 1. The surface numbers are indicated by Si (i=1 to 15) in order from the surface S1 on the object side of the first lens L1. S5 is the aperture stop ST. S13 is the object side surface of the cover glass CG. S14 is the image side of the cover glass CG. S15 is the imaging plane IP of the image sensor 11. The surface interval Di (i=1–14, unit mm) is the distance from the surface Si to the surface Si+1 along the optical axis Z1.

Lens data of Example 1 is shown in Tables 1 and 2 below. Table 1 shows the surface number i of each surface Si, the curvature radius Ri (i=1 to 12, unit mm) of each surface Si, the distance Di, the refractive index n for d-line (wavelength 587.6 nm), the Abbe number vd (=(nd−1)/(nF−nC); nF is the refractive index for F-line (wavelength 486.1 nm), and nC is the refractive index for C-line (wavelength 656.3 nm)), of the imaging lens 10 of Example 1. In addition, the "*" mark attached to the surface number "i" indicates that it is an aspherical surface. Surfaces that does not have the "*" mark in the surface number "i" are spherical. The temperature coefficient of relative refractive index dn/dt (−20/0), dn/dt (20/40), and dn/dt (60/80) are values within the temperature range of −20° C. to 0° C., 20° C. to 40° C., and 60° C. to 80° C. The unit of temperature coefficient of relative refractive index dn/dt is $10^{-6}$/° C. In addition, "—" is used where no numerical value is given (the same applies to other examples described later).

TABLE 1

Example 1 Basic lens data

| i | Ri | Di | nd | vd | dn/dt (−20/0) | dn/dt (20/40) | dn/dt (60/80) |
|---|---|---|---|---|---|---|---|
| 1* | 12.097 | 1.05 | 1.67790 | 54.9 | 3.0 | 3.6 | 3.8 |
| 2* | 3.100 | 2.84 | — | — | — | — | — |
| 3* | −3.230 | 1.01 | 1.67790 | 54.9 | 3.0 | 3.6 | 3.8 |
| 4* | −4.568 | 0.41 | — | — | — | — | — |
| 5 (Stop) | inf | 0.45 | — | — | — | — | — |
| 6 | 13.260 | 3.26 | 1.59282 | 68.6 | −5.3 | −5.6 | −5.8 |
| 7 | −7.893 | 0.28 | — | — | — | — | — |
| 8* | −98.907 | 3.72 | 1.49700 | 81.6 | −8.5 | −8.5 | −8.4 |
| 9* | −5.552 | 1.94 | — | — | — | — | — |
| 10 | −50.905 | 1.01 | 1.94595 | 18.0 | 4.4 | 5.2 | 5.8 |
| 11 | 12.459 | 3.41 | 1.72916 | 54.7 | 3.5 | 3.6 | 3.6 |
| 12 | −12.459 | 4.88 | — | — | — | — | — |
| 13 (CG) | inf | 0.50 | 1.51633 | 64.1 | — | — | — |
| 14 (CG) | inf | 0.17 | — | — | — | — | — |
| 15 (Imaging plane) | inf | — | — | — | — | — | — |

The aspheric surface is represented by a following aspheric expression of the following condition (6). In the following aspheric expression of Equation 1, "Z" is the depth (mm) of the aspheric surface, "h" is the distance from the optical axis to the lens surface (mm), "C" is the paraxial curvature (that is, in the case where the paraxial curvature radius is R (mm), C=1/R), "K" is the conic constant, and "Ai" is the aspherical coefficient. In Table 2, "K" and "Ai" of each aspherical surface (see "*" mark in Table 1) of Example 1 are shown.

[Equation 1]

$$Z = \frac{Ch^2}{1+\sqrt{1-(K+1)(Ch)^2}} + \Sigma A_i h^i \quad (6)$$

TABLE 2

Example 1 Aspherical data

| Aspherical coefficient | S1 | S3 | S8 |
|---|---|---|---|
| K | 4.27397E+00 | −1.98286E−01 | 3.54999E+01 |
| A4 | −4.83328E−03 | 2.32132E−03 | −2.75647E−04 |
| A6 | 3.86603E−04 | 6.20189E−04 | −3.07072E−05 |
| A8 | −2.23748E−05 | −1.77284E−05 | 4.74234E−06 |
| A10 | 7.36912E−07 | 1.42342E−06 | −1.73403E−07 |
| A12 | −1.08098E−08 | −4.39165E−20 | 2.54543E−09 |

| Aspherical coefficient | S2 | S4 | S9 |
|---|---|---|---|
| K | −2.99304E−01 | 9.41194E−01 | 1.66372E−01 |
| A4 | −7.44623E−03 | 4.31942E−03 | 1.25290E−03 |
| A6 | 5.25479E−04 | 3.09595E−04 | −3.16274E−06 |
| A8 | −5.77757E−05 | 5.17892E−05 | 3.41270E−06 |
| A10 | 2.64262E−06 | −6.39580E−06 | −1.29314E−07 |
| A12 | −7.62078E−08 | 4.99920E−07 | 4.76433E−09 |
| A14 | −1.48149E−22 | — | — |
| A16 | −5.00682E−25 | — | — |

As shown in Table 3 below, the imaging lens 10 of Example 1 satisfies the condition (1), the condition (2), the condition (3), the condition (4), and the condition (5). It also satisfies the condition (1a), the condition (1b), the condition (1c), the condition (1d), the condition (1e), the condition (1f), and the condition (2a). Da is the sum of D6 to D11. Dr is the sum of D5 to D11. Dt is the sum of D1 to D11. Db is D12. Df is the sum of D1 to D4. Rr is the curvature radius R6 of the surface S6. Re is the curvature radius R12 of the surface S12.

TABLE 3

Example 1 Lens data

| | |
|---|---|
| (Rr + \| Re \|)/Da | 1.89 |
| ((R1 + \| Re \|)/Dt | 1.27 |
| R1/(Dt + Db) | 0.50 |
| Rr/(Da + Db) | 0.72 |
| \| Re \|/Db | 2.56 |
| Rr/Re | 1.06 |
| Re/Da | −0.91 |
| Rr/Da | 0.97 |
| Dt/f$_{16}$ | 4.31 |
| Da/f$_{16}$ | 3.03 |
| Df/Dr | 0.38 |
| R1/Re | −0.97 |

Table 4 shows the focal length (mm) of the each lens, the front group, the rear group, and the entire imaging lens of the imaging lens 10 in Example 1.

TABLE 4

| Lens No. | Focal length of each lens | Focal length of cemented lens CL | Focal length of front group and rear group | Focal length of imaging lens 10 |
|---|---|---|---|---|
| L1 | −6.441 | — | −4.963 | 4.500 |
| L2 | −23.387 | — | | |
| L3 | 8.807 | — | 11.258 | |
| L4 | 11.670 | — | | |
| L5 | −45.935 | 38.274 | | |
| L6 | 23.535 | | | |

Figure 8:
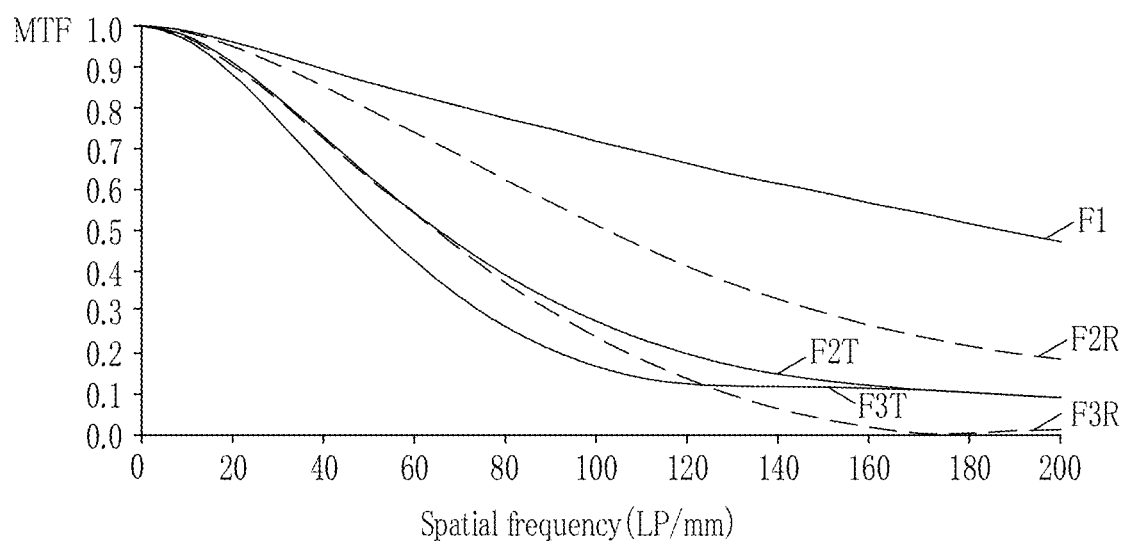
FIG. 8 is a graph which illustrates MTF in Example 1.
Figure 10:
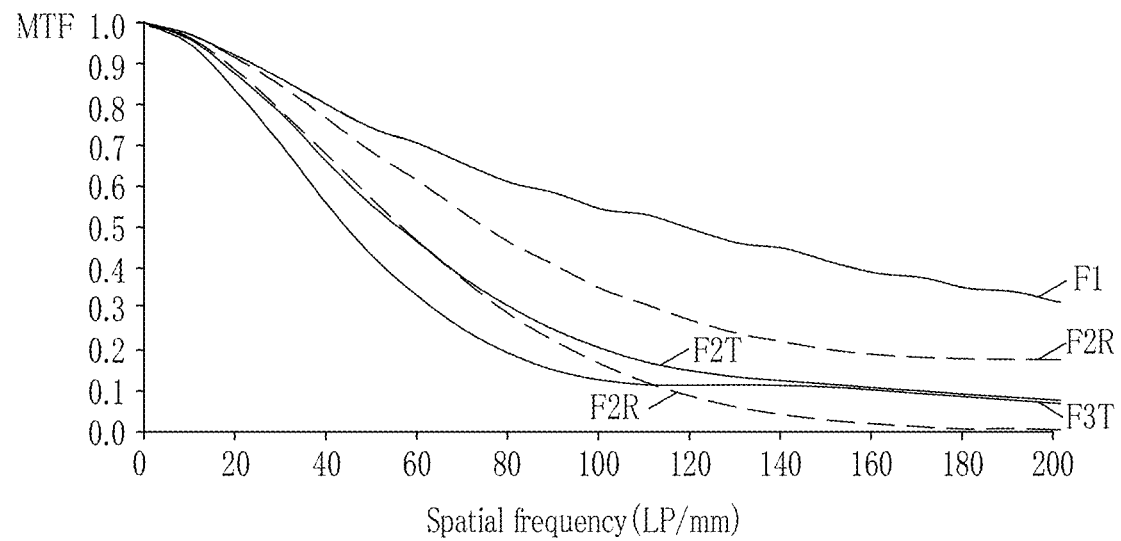
FIG. 10 is a graph which illustrates MTF in Example 2.
Figure 11A:
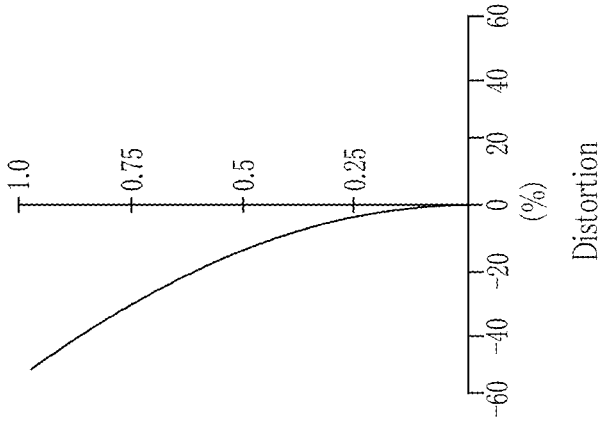
FIG. 11A is a graph which illustrates spherical aberration in Example 3.
Figure 11B:
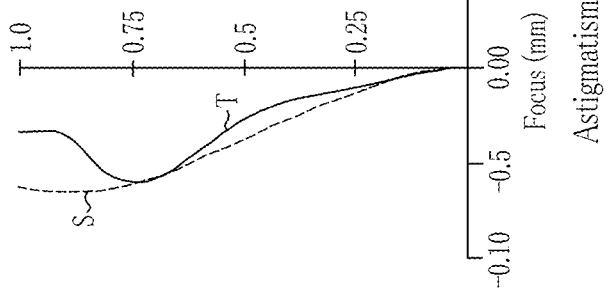
FIG. 11B is a graph which illustrates astigmatism in Example 3.
Figure 11C:
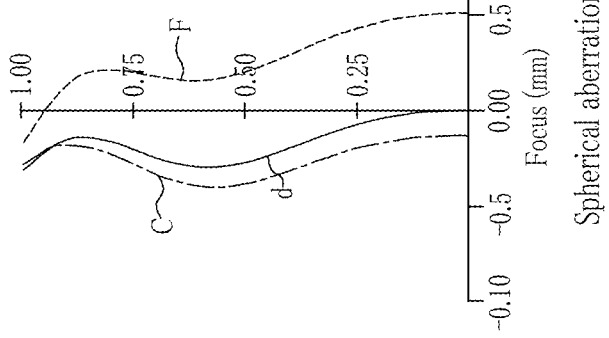
FIG. 11C is a graph which illustrates distortion in Example 3.
Figure 12:
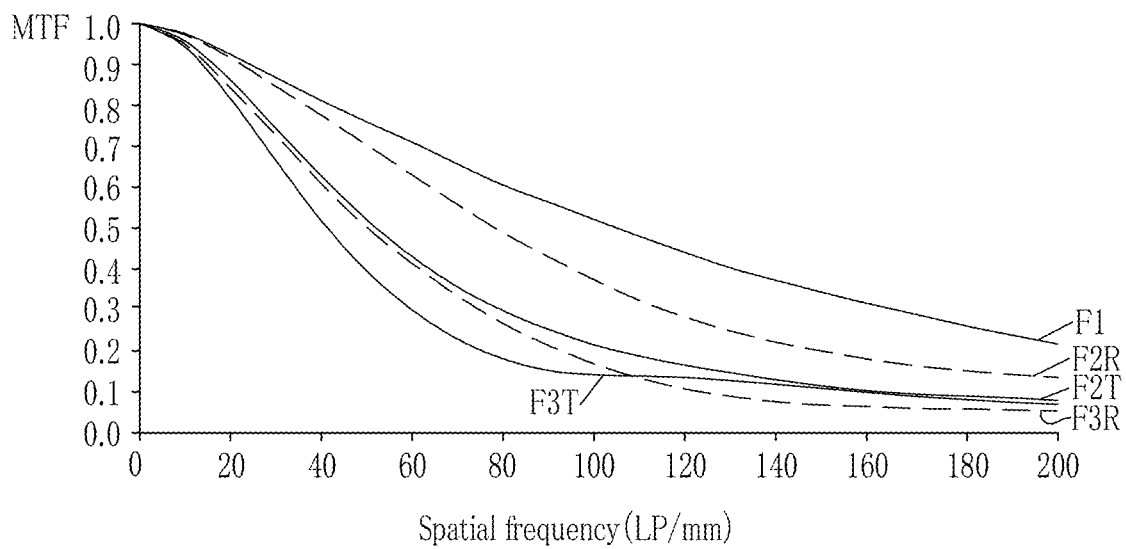
FIG. 12 is a graph which illustrates MTF in Example 3.
Figure 13A:
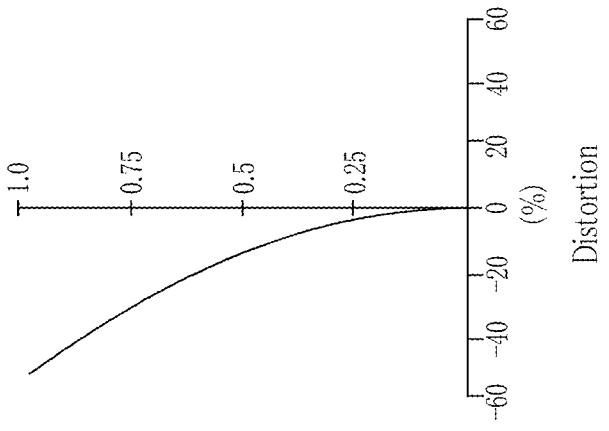
FIG. 13A is a graph which illustrates spherical aberration in Example 4.
Figure 13B:
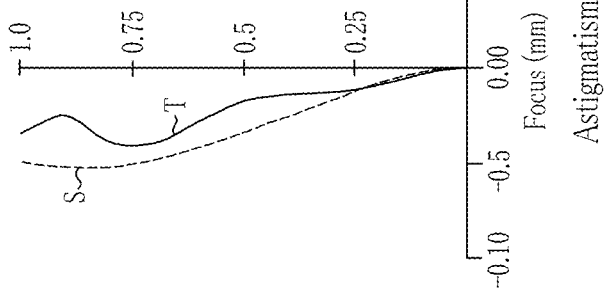
FIG. 13B is a graph which illustrates astigmatism in Example 4.
Figure 13C:
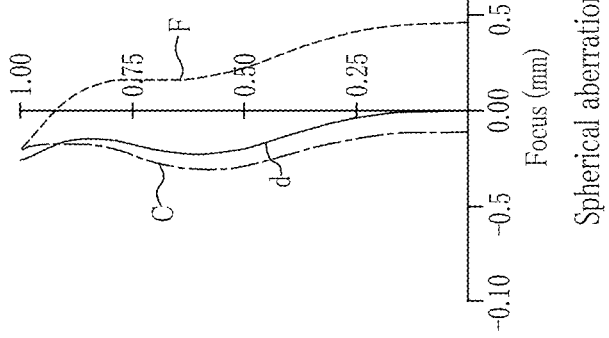
FIG. 13C is a graph which illustrates distortion in Example 4.
Figure 14:
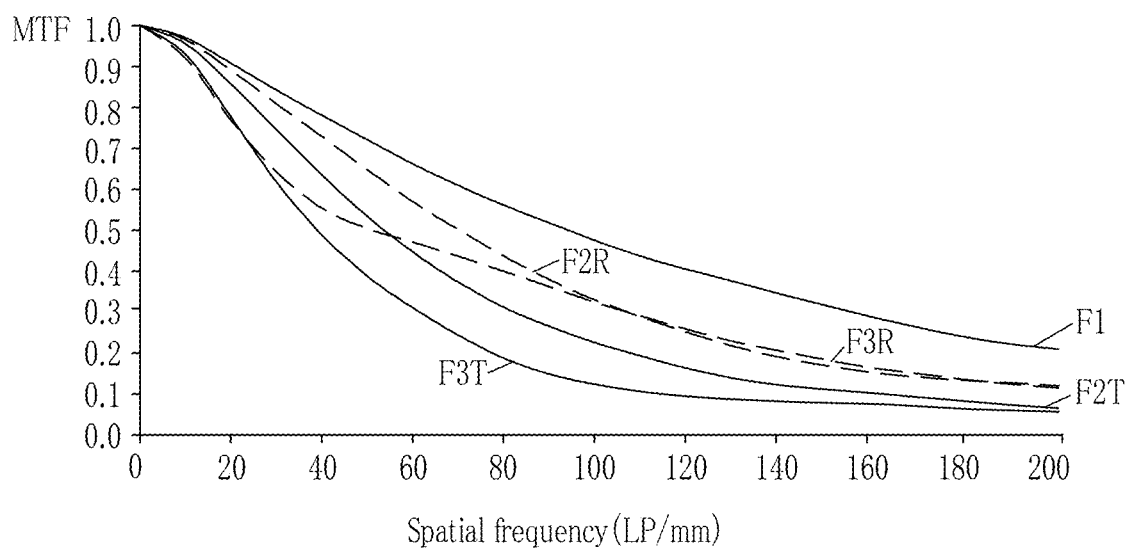
FIG. 14 is a graph which illustrates MTF in Example 4.
Figure 15A:
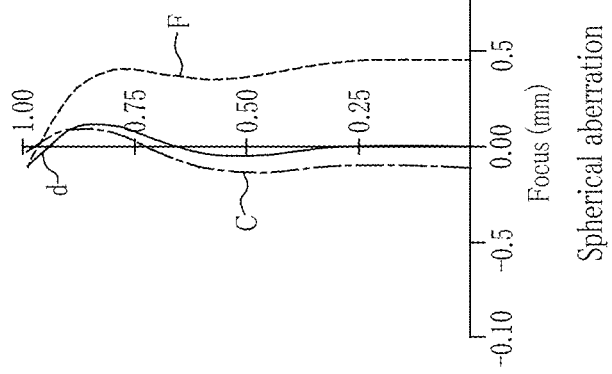
FIG. 15A is a graph which illustrates spherical aberration in Example 5.
Figure 15B:
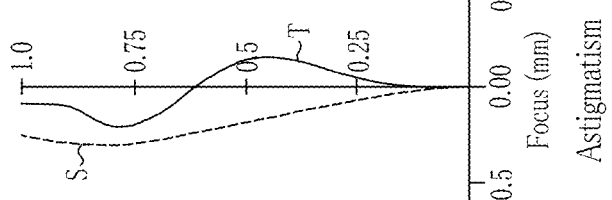
FIG. 15B is a graph which illustrates astigmatism in Example 5.
Figure 15C:
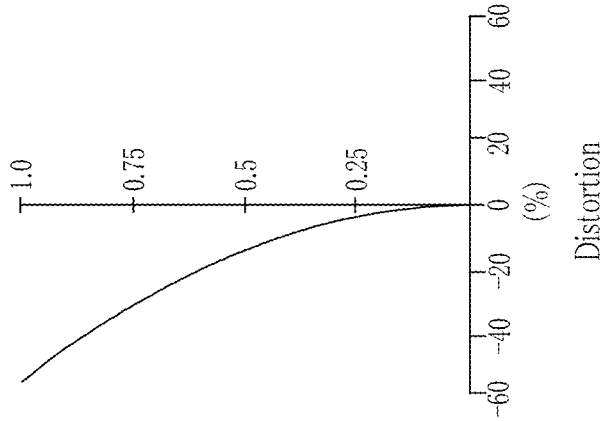
FIG. 15C is a graph which illustrates distortion in Example 5.
Figure 16:
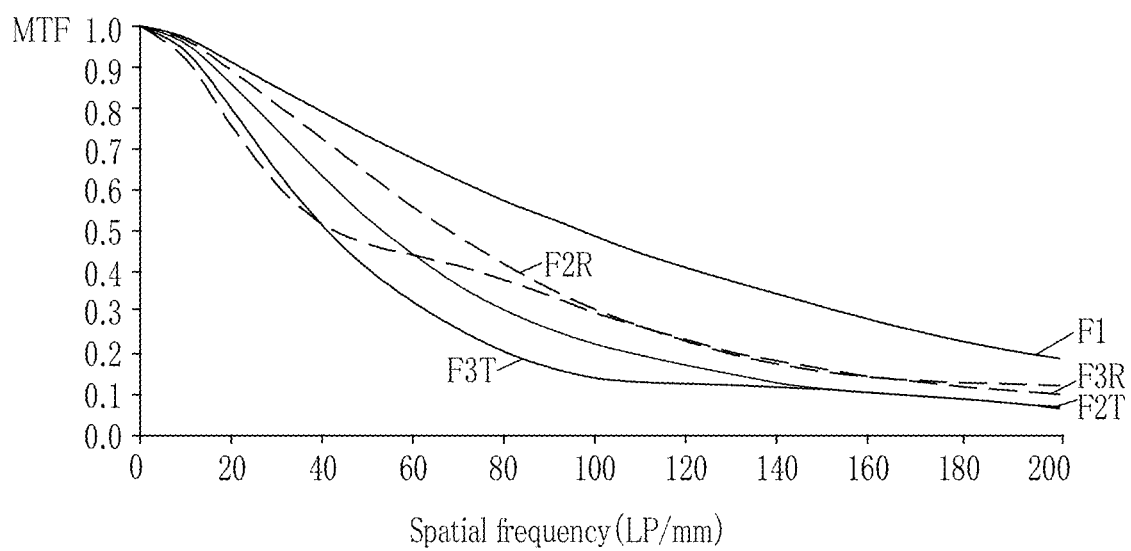
FIG. 16 is a graph which illustrates MTF in Example 5.
Figure 17:
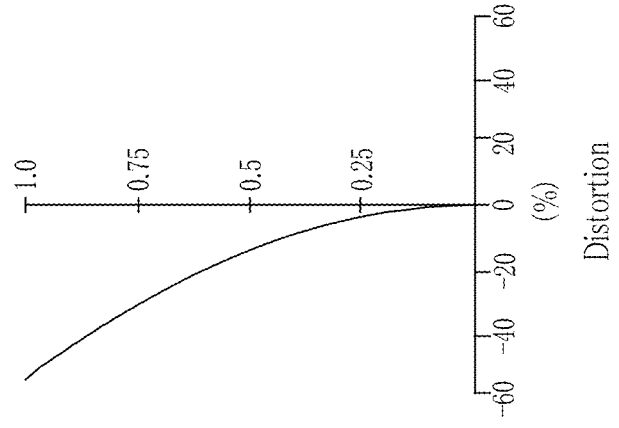
FIG. 17A is a graph which illustrates spherical aberration in Example 6.
FIG. 17B is a graph which illustrates astigmatism in Example 6.
FIG. 17C is a graph which illustrates distortion in Example 6.
Figure 18:
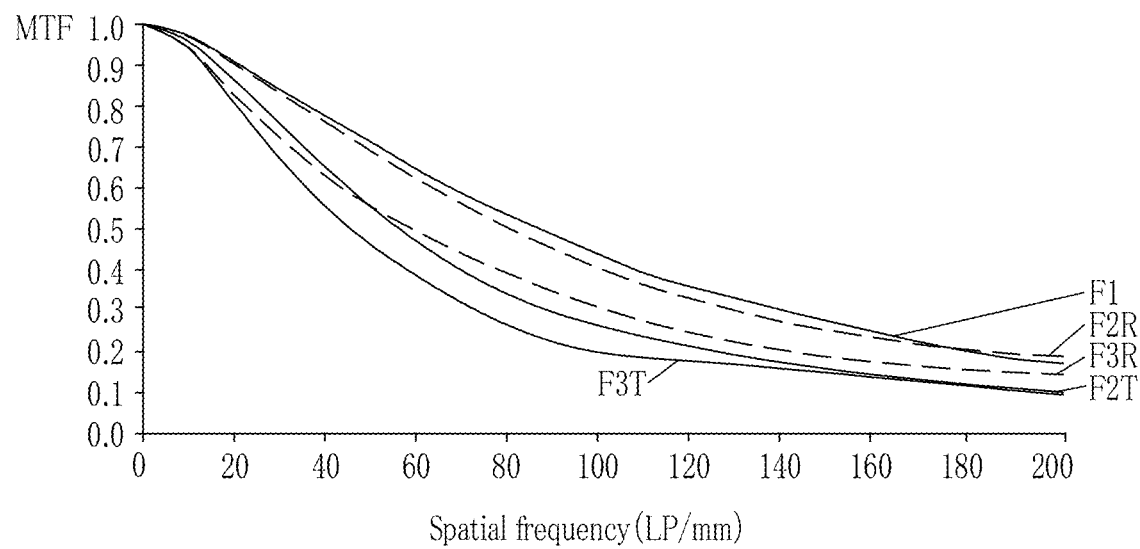
FIG. 18 is a graph which illustrates MTF in Example 6.
Figure 20:
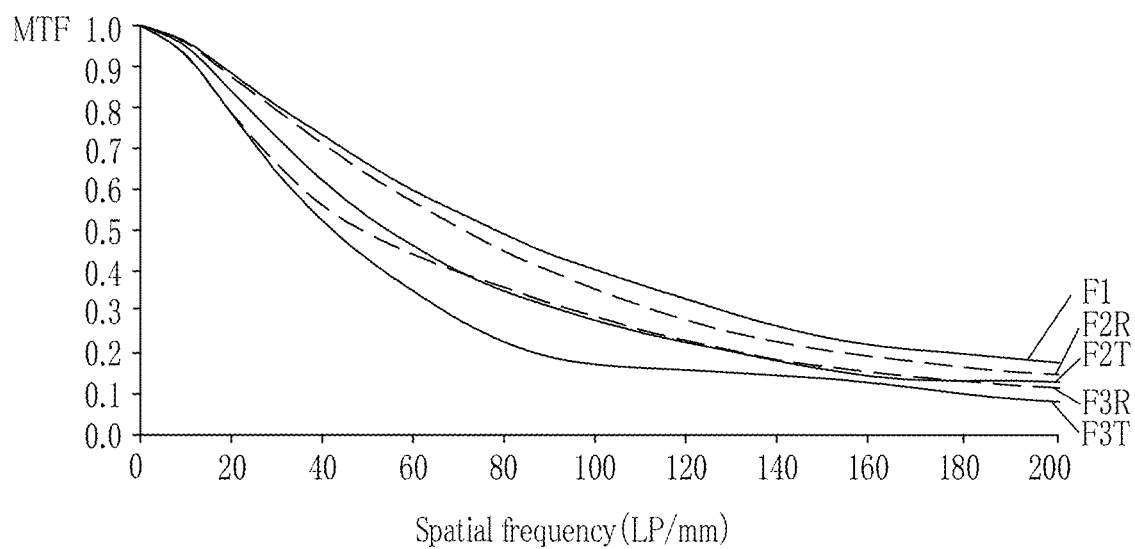
FIG. 20 is a graph which illustrates MTF in Example 7.
Figure 22:
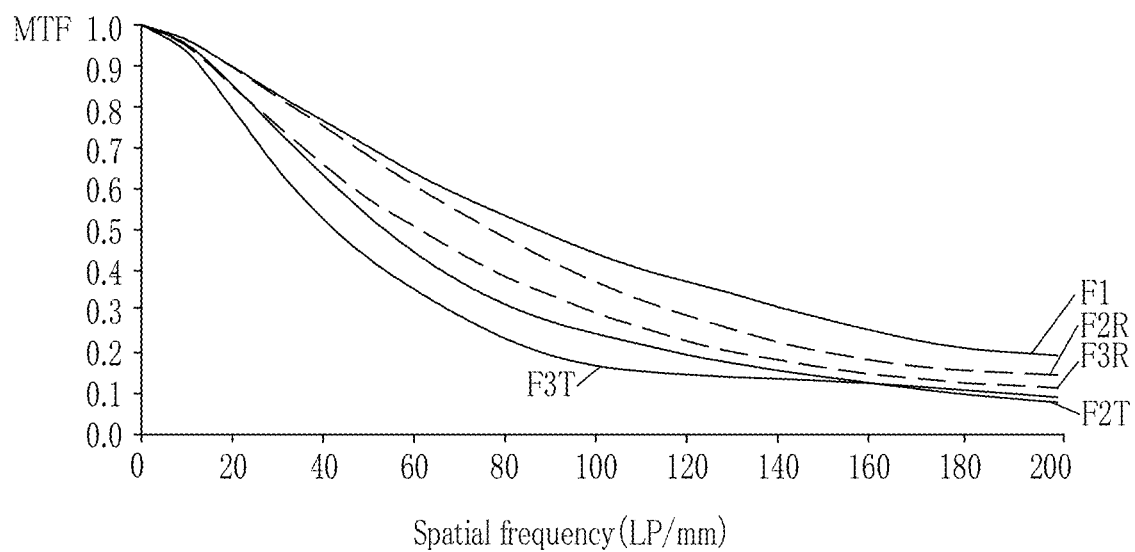
FIG. 22 is a graph which illustrates MTF in Example 8.
Figure 23A:
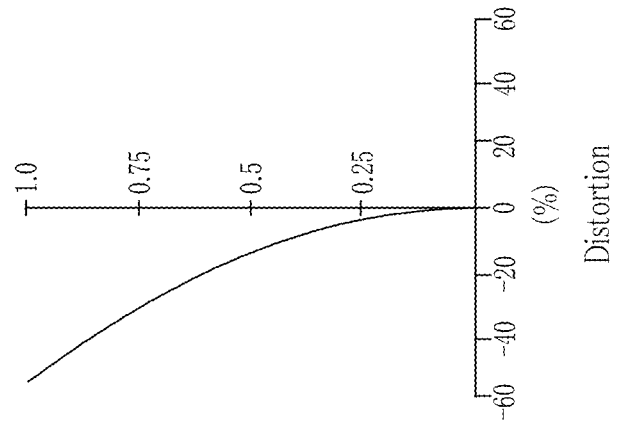
FIG. 23A is a graph which illustrates spherical aberration in Example 9.
Figure 23B:
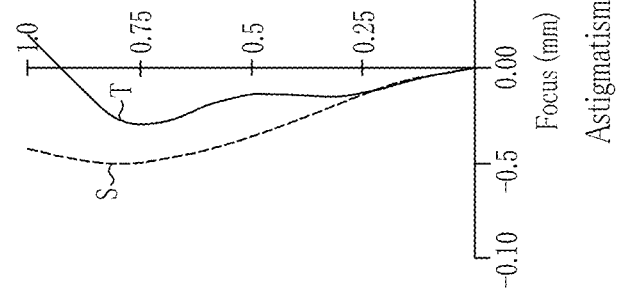
FIG. 23B is a graph which illustrates astigmatism in Example 9.
Figure 23C:
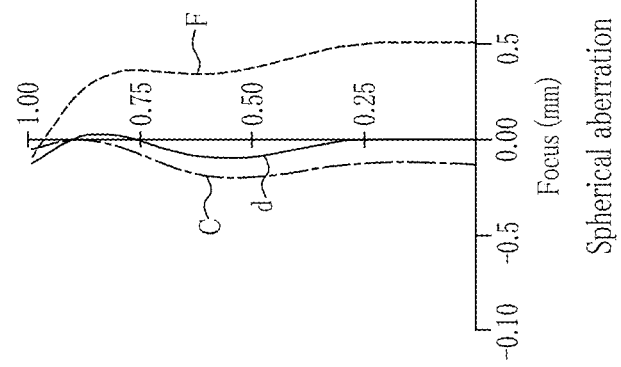
FIG. 23C is a graph which illustrates distortion in Example 9.
Figure 24:
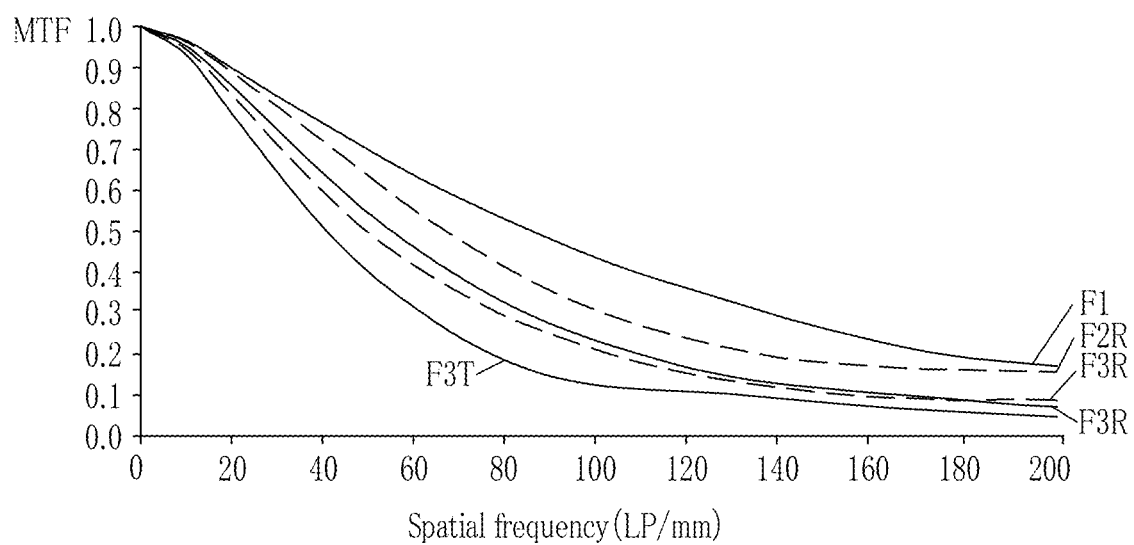
FIG. 24 is a graph which illustrates MTF in Example 9.
Figure 26:
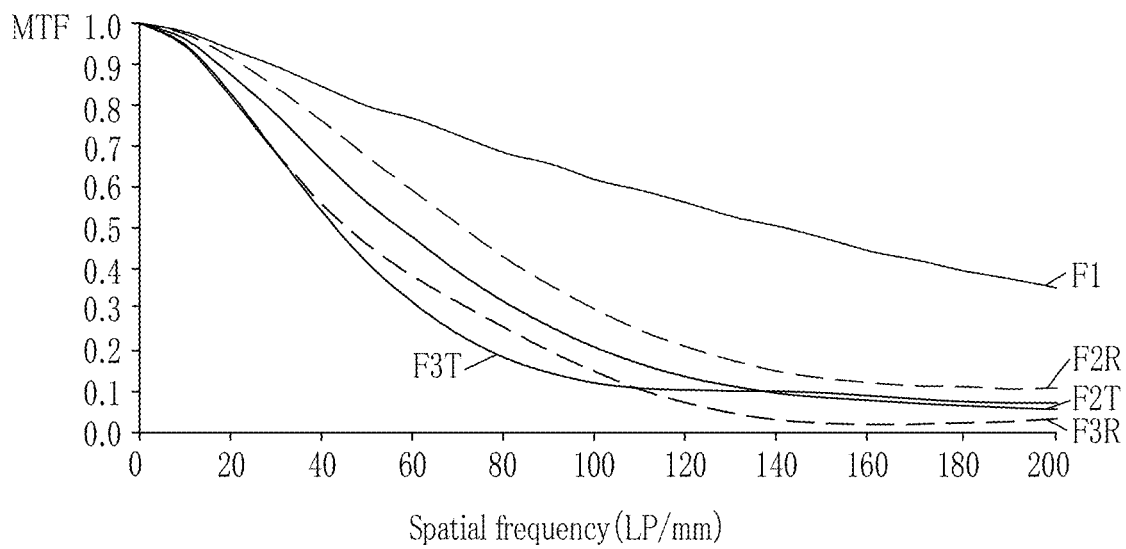
FIG. 26 is a graph which illustrates MTF in Example 10.

FIG. 7A shows each spherical aberration of d-line, F-line, and C-line for the imaging lens 10 of Example 1. FIG. 7B shows the astigmatism S in the sagittal (radical) direction and the astigmatism T in the tangential (meridional) direction of the d line for the imaging lens 10 of Example 1. FIG. 7C shows the distortion of the imaging lens 10 of Example 1. FIG. 8 shows the MTF of Example 1 at 22° C. In FIG. 8, the reference numeral F1 indicates the MTF on the optical axis Z1. The reference numeral F2R indicates the MTF in the sagittal direction at a point 26 degrees from the optical axis Z1. The reference numeral F2T indicates the MTF in the tangential direction at the point 26 degrees from the optical axis Z1. The reference numeral F3R indicates the MTF in the sagittal direction at a point 60 degrees from the optical axis Z1. The reference numeral F3T indicates the MTF in the tangential direction at the point 60 degrees from the optical axis Z1.

As shown in FIGS. 6 to 8, the imaging lens 10 of Example 1 suppresses ghosting caused by reflected light and has excellent optical performance, though it has the simple configuration of 6 elements in 5 groups and has the infrared ray cutting function with the infrared ray cut coat.

As in Example 1 above, the various lens data for the imaging lenses 2 to 10 are shown in Tables 5 to 31, and spherical aberration, astigmatism, distortion, and MTF are shown in FIGS. 9A to 26.

In the examples, data of spherical aberration, astigmatism, and distortion are all at 22° C.

TABLE 5

Example 2 Basic lens data

| i | Ri | Di | nd | vd | dn/dt (−20/0) | dn/dt (20/40) | dn/dt (60/80) |
|---|---|---|---|---|---|---|---|
| 1* | 12.593 | 1.050 | 1.67790 | 54.9 | 3.0 | 3.6 | 3.8 |
| 2* | 3.077 | 2.821 | — | — | — | — | — |
| 3* | −3.210 | 1.000 | 1.67790 | 54.9 | 3.0 | 3.6 | 3.8 |
| 4* | −4.556 | 0.206 | — | — | — | — | — |
| 5 (Stop) | inf | 0.598 | — | — | — | — | — |
| 6 | 13.362 | 3.452 | 1.59282 | 68.6 | −5.3 | −5.6 | −5.8 |

TABLE 5-continued

Example 2 Basic lens data

| i | Ri | Di | nd | vd | dn/dt (−20/0) | dn/dt (20/40) | dn/dt (60/80) |
|---|---|---|---|---|---|---|---|
| 7 | −7.411 | 0.280 | — | — | — | — | — |
| 8* | −63.925 | 3.469 | 1.49700 | 81.6 | −8.5 | −8.5 | −8.4 |
| 9* | −5.418 | 1.769 | — | — | — | — | — |
| 10 | −44.870 | 2.055 | 1.94595 | 18.0 | 4.4 | 5.2 | 5.8 |
| 11 | 12.109 | 3.821 | 1.72916 | 54.7 | 3.5 | 3.6 | 3.6 |
| 12 | −12.109 | 4.470 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 6

Example 2 Aspherical data

| Aspherical coefficient | S1 | S3 | S8 |
|---|---|---|---|
| K | 4.36129E+00 | −2.25793E−01 | 3.86134E+01 |
| A4 | −4.75137E−03 | 2.78315E−03 | −2.61384E−04 |
| A6 | 3.87109E−04 | 6.16522E−04 | −3.81285E−05 |
| A8 | −2.23535E−05 | −2.11401E−05 | 5.94378E−06 |
| A10 | 7.38305E−07 | 1.31184E−06 | −2.49831E−07 |
| A12 | −1.07224E−08 | −3.54126E−20 | 4.40887E−09 |

| Aspherical coefficient | S2 | S4 | S9 |
|---|---|---|---|
| K | −2.89255E−01 | 9.51057E−01 | −3.34836E−01 |
| A4 | −7.71831E−03 | 4.84214E−03 | 8.24219E−04 |
| A6 | 5.47707E−04 | 3.29568E−04 | 1.48434E−05 |
| A8 | −5.60507E−05 | 5.18642E−05 | −7.85280E−07 |
| A10 | 2.20427E−06 | −6.52311E−06 | 1.14571E−07 |
| A12 | −7.62078E−08 | 4.97200E−07 | −1.62775E−09 |
| A14 | −8.52065E−22 | — | — |
| A16 | −5.13541E−25 | — | — |

TABLE 7

Example 2 Lens data

| | |
|---|---|
| (Rr + \|Re\|)/Da | 1.72 |
| ((R1 + \|Re\|)/Dt | 1.20 |
| R1/(Dt + Db) | 0.50 |
| Rr/(Da + Db) | 0.69 |
| \|Re\|/Db | 2.71 |
| Rr/Re | −1.10 |
| Re/Da | −0.82 |
| Rr/Da | 0.90 |
| Dt/$f_{16}$ | 4.56 |
| Da/$f_{16}$ | 3.30 |
| Df/Dr | 0.33 |
| R1/Re | −1.04 |

TABLE 8

Example 3 Basic lens data

| i | Ri | Di | nd | vd | dn/dt (−20/0) | dn/dt (20/40) | dn/dt (60/80) |
|---|---|---|---|---|---|---|---|
| 1* | 12.108 | 1.051 | 1.67790 | 54.9 | 3.0 | 3.6 | 3.8 |
| 2* | 3.122 | 2.845 | — | — | — | — | — |
| 3* | −3.230 | 1.077 | 1.67790 | 54.9 | 3.0 | 3.6 | 3.8 |
| 4* | −4.567 | 0.366 | — | — | — | — | — |
| 5 (Stop) | inf | 0.309 | — | — | — | — | — |
| 6 | 12.638 | 3.372 | 1.59282 | 68.6 | −5.3 | −5.6 | −5.8 |
| 7 | −7.948 | 0.4551 | — | — | — | — | — |
| 8* | −74.708 | 3.152 | 1.49700 | 81.6 | −8.5 | −8.5 | −8.4 |
| 9* | −5.462 | 1.032 | — | — | — | — | — |
| 10 | −47.105 | 1.010 | 1.94595 | 18.0 | 4.4 | 5.2 | 5.8 |
| 11 | 13.098 | 3.298 | 1.72916 | 54.7 | 3.5 | 3.6 | 3.6 |
| 12 | −13.098 | 5.677 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 9

Example 3 Aspherical data

| Aspherical coefficient | S1 | S3 | S8 |
|---|---|---|---|
| K | 4.26780E+00 | −2.01264E−01 | −1.31103E+01 |
| A4 | −4.81968E−03 | 2.33778E−03 | −1.67528E−04 |
| A6 | 3.86374E−04 | 6.22073E−04 | −3.10031E−05 |
| A8 | −2.23811E−05 | −1.80733E−05 | 3.70461E−06 |
| A10 | 7.36696E−07 | 1.42435E−06 | 7.11784E−10 |
| A12 | −1.08117E−08 | −4.38659E−20 | −3.56197E−09 |

| Aspherical coefficient | S2 | S4 | S9 |
|---|---|---|---|
| K | −2.97310E−01 | 9.41113E−01 | 1.37224E−01 |
| A4 | −7.63481E−03 | 4.33352E−03 | 1.36473E−03 |
| A6 | 5.60967E−04 | 3.11894E−04 | −1.12030E−05 |
| A8 | −6.00304E−05 | 5.19494E−05 | 4.85547E−06 |
| A10 | 2.42649E−06 | −6.38684E−06 | −1.98305E−07 |
| A12 | −7.62078E−08 | 4.99899E−07 | 7.14925E−09 |
| A14 | −1.52822E−22 | — | — |
| A16 | −5.00641E−25 | — | — |

TABLE 10

Example 3 Lens data

| | |
|---|---|
| (Rr + \| Re \|)/Da | 2.09 |
| ((R1 + \| Re \|)/Dt | 1.40 |
| R1/(Dt + Db) | 0.51 |
| Rr/(Da + Db) | 0.70 |
| \| Re \|/Db | 2.31 |
| Rr/Re | −0.96 |
| Re/Da | −1.06 |
| Rr/Da | 1.03 |
| Dt/f$_{16}$ | 3.99 |
| Da/f$_{16}$ | 2.74 |
| Df/Dr | 0.42 |
| R1/Re | −0.92 |

TABLE 11

Example 4 Basic lens data

| i | Ri | Di | nd | νd | dn/dt (−20/0) | dn/dt (20/40) | dn/dt (60/80) |
|---|---|---|---|---|---|---|---|
| 1* | 12.151 | 1.050 | 1.67790 | 54.9 | 3.0 | 3.6 | 3.8 |
| 2* | 3.070 | 2.872 | — | — | — | — | — |
| 3* | −3.229 | 1.036 | 1.67790 | 54.9 | 3.0 | 3.6 | 3.8 |
| 4* | −4.563 | 0.371 | — | — | — | — | — |
| 5 (Stop) | inf | 0.273 | — | — | — | — | — |
| 6 | 12.773 | 3.244 | 1.59282 | 68.6 | −5.3 | −5.6 | −5.8 |
| 7 | −8.051 | 0.2317 | — | — | — | — | — |
| 8* | −52.319 | 3.499 | 1.49700 | 81.6 | −8.5 | −8.5 | −8.4 |
| 9* | −5.341 | 1.332 | — | — | — | — | — |
| 10 | −53.873 | 1.010 | 1.94595 | 18.0 | 4.4 | 5.2 | 5.8 |
| 11 | 12.790 | 3.390 | 1.72916 | 54.7 | 3.5 | 3.6 | 3.6 |
| 12 | −12.790 | 5.609 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 12

Example 4 Aspherical data

| Aspherical coefficient | S1 | S3 | S8 |
|---|---|---|---|
| K | 4.29885E+00 | −2.23214E−01 | 2.58008E+00 |
| A4 | −4.83081E−03 | 2.52532E−03 | −2.95047E−04 |
| A6 | 3.85398E−04 | 6.15264E−04 | −2.18514E−05 |
| A8 | −2.23767E−05 | −2.13368E−05 | 2.91355E−06 |
| A10 | 7.37287E−07 | 1.38824E−06 | 2.94442E−08 |
| A12 | −1.07673E−08 | −4.33755E−20 | −3.56197E−09 |

| Aspherical coefficient | S2 | S4 | S9 |
|---|---|---|---|
| K | −2.92253E−01 | 9.44965E−01 | 1.55483E−01 |
| A4 | −7.78340E−03 | 4.55738E−03 | 1.22170E−03 |
| A6 | 5.74157E−04 | 3.16806E−04 | 3.77582E−06 |
| A8 | −6.04419E−05 | 5.16140E−05 | 3.77163E−06 |
| A10 | 2.32110E−06 | −6.47067E−06 | −1.65917E−07 |
| A12 | −7.62078E−08 | 4.99899E−07 | 7.14924E−09 |
| A14 | −1.48120E−22 | — | — |
| A16 | −5.00218E−25 | — | — |

TABLE 13

Example 4 Lens data

| | |
|---|---|
| (Rr + \| Re \|)/Da | 2.01 |
| ((R1 + \| Re \|)/Dt | 1.36 |
| R1/(Dt + Db) | 0.51 |
| Rr/(Da + Db) | 0.70 |
| \| Re \|/Db | 2.28 |
| Rr/Re | −1.01 |
| Re/Da | −1.01 |
| Rr/Da | 1.01 |
| Dt/f$_{16}$ | 4.07 |
| Da/f$_{16}$ | 2.82 |
| Df/Dr | 0.41 |
| R1/Re | −0.95 |

TABLE 14

Example 5 Basic lens data

| i | Ri | Di | nd | vd | dn/dt (−20/0) | dn/dt (20/40) | dn/dt (60/80) |
|---|---|---|---|---|---|---|---|
| 1* | 12.112 | 1.050 | 1.67790 | 54.9 | 3.0 | 3.6 | 3.8 |
| 2* | 3.089 | 2.841 | — | — | — | — | — |
| 3* | −3.227 | 1.054 | 1.67790 | 54.9 | 3.0 | 3.6 | 3.8 |
| 4* | −4.556 | 0.321 | — | — | — | — | — |
| 5 (Stop) | inf | 0.377 | — | — | — | — | — |
| 6 | 12.013 | 3.560 | 1.59282 | 68.6 | −5.3 | −5.6 | −5.8 |
| 7 | −8.009 | 0.2680 | — | — | — | — | — |
| 8* | −52.655 | 3.150 | 1.49700 | 81.6 | −8.5 | −8.5 | −8.4 |
| 9* | −5.332 | 1.305 | — | — | — | — | — |
| 10 | −44.495 | 1.010 | 1.94595 | 18.0 | 4.4 | 5.2 | 5.8 |
| 11 | 13.348 | 3.258 | 1.72916 | 54.7 | 3.5 | 3.6 | 3.6 |
| 12 | −13.348 | 5.542 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 15

Example 5 Aspherical data

| Aspherical coefficient | S1 | S3 | S8 |
|---|---|---|---|
| K | 4.29751E+00 | −2.47058E−01 | 8.83968E+00 |
| A4 | −4.81587E−03 | 2.99401E−03 | −3.01132E−04 |
| A6 | 3.84783E−04 | 6.25124E−04 | −2.27319E−05 |
| A8 | −2.23990E−05 | −2.41284E−05 | 1.72137E−06 |
| A10 | 7.36787E−07 | 1.11616E−06 | 8.52344E−08 |
| A12 | −1.07660E−08 | −4.34480E−20 | −3.56197E−09 |

| Aspherical coefficient | S2 | S4 | S9 |
|---|---|---|---|
| K | −2.93759E−01 | 9.51301E−01 | 1.83473E−01 |
| A4 | −7.60996E−03 | 4.97208E−03 | 1.30828E−03 |
| A6 | 5.67929E−04 | 3.28821E−04 | 1.03547E−06 |
| A8 | −5.98341E−05 | 5.12386E−05 | 3.34405E−06 |
| A10 | 2.42750E−06 | −6.60926E−06 | −1.32949E−07 |
| A12 | −7.62078E−08 | 4.99899E−07 | 7.14924E−09 |

TABLE 15-continued

Example 5 Aspherical data

| A14 | −1.42971E−22 | — | — |
|---|---|---|---|
| A16 | −5.00218E−25 | — | — |

TABLE 16

Example 5 Lens data

| (Rr + \| Re \|)/Da | 2.02 |
|---|---|
| ((R1 + \| Re \|)/Dt | 1.40 |
| R1/(Dt + Db) | 0.51 |
| Rr/(Da + Db) | 0.66 |
| \| Re \|/Db | 2.41 |
| Rr/Re | −0.90 |
| Re/Da | −1.06 |
| Rr/Da | 0.96 |
| Dt/f$_{16}$ | 4.04 |
| Da/f$_{16}$ | 2.79 |
| Df/Dr | 0.41 |
| R1/Re | −0.91 |

TABLE 17

Example 6 Basic lens data

| i | Ri | Di | nd | vd | dn/dt (−20/0) | dn/dt (20/40) | dn/dt (60/80) |
|---|---|---|---|---|---|---|---|
| 1* | 12.114 | 1.063 | 1.67790 | 54.9 | 3.0 | 3.6 | 3.8 |
| 2* | 3.150 | 2.875 | — | — | — | — | — |
| 3* | −3.218 | 1.103 | 1.67790 | 54.9 | 3.0 | 3.6 | 3.8 |
| 4* | −4.561 | 0.333 | — | — | — | — | — |
| 5 (Stop) | inf | 0.467 | — | — | — | — | — |
| 6 | 12.574 | 3.361 | 1.59282 | 68.6 | −5.3 | −5.6 | −5.8 |
| 7 | −7.788 | 0.5044 | — | — | — | — | — |
| 8* | −125.254 | 3.150 | 1.49700 | 81.6 | −8.5 | −8.5 | −8.4 |
| 9* | −5.594 | 1.101 | — | — | — | — | — |
| 10 | −40.151 | 1.010 | 1.94595 | 18.0 | 4.4 | 5.2 | 5.8 |
| 11 | 13.473 | 3.203 | 1.72916 | 54.7 | 3.5 | 3.6 | 3.6 |
| 12 | −13.473 | 5.490 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 18

Example 6 Aspherical data

| Aspherical coefficient | S1 | S3 | S8 |
|---|---|---|---|
| K | 4.29441E+00 | −2.28627E−01 | 3.86543E+01 |
| A4 | −4.77714E−03 | 2.17694E−03 | −3.53413E−04 |
| A6 | 3.84639E−04 | 6.29166E−04 | −8.73935E−06 |
| A8 | −2.24114E−05 | −2.18406E−05 | 5.90821E−07 |
| A10 | 7.36714E−07 | 1.66723E−06 | 1.01796E−07 |
| A12 | −1.07423E−08 | −6.00667E−20 | −3.56197E−09 |

| Aspherical coefficient | S2 | S4 | S9 |
|---|---|---|---|
| K | −2.55487E−01 | 9.40859E−01 | 3.05666E−01 |
| A4 | −7.61537E−03 | 4.26056E−03 | 1.36802E−03 |
| A6 | 5.47866E−04 | 3.10603E−04 | −1.00446E−05 |
| A8 | −5.94752E−05 | 5.22260E−05 | 4.44590E−06 |
| A10 | 2.37208E−06 | −6.32909E−06 | −1.78168E−07 |
| A12 | −7.62078E−08 | 4.99898E−07 | 7.14924E−09 |
| A14 | −3.02586E−21 | — | — |
| A16 | −5.00210E−25 | — | — |

TABLE 19

Example 6 Lens data

| | |
|---|---|
| (Rr + \| Re \|)/Da | 2.11 |
| ((R1 + \| Re \|)/Dt | 1.41 |
| R1/(Dt + Db) | 0.53 |
| Rr/(Da + Db) | 0.74 |
| \| Re \|/Db | 2.88 |
| Rr/Re | −0.93 |
| Re/Da | −1.09 |
| Rr/Da | 1.02 |
| Dt/$f_{16}$ | 4.04 |
| Da/$f_{16}$ | 2.74 |
| Df/Dr | 0.42 |
| R1/Re | −0.90 |

TABLE 20

Example 7 Basic lens data

| i | Ri | Di | nd | νd | dn/dt (−20/0) | dn/dt (20/40) | dn/dt (60/80) |
|---|---|---|---|---|---|---|---|
| 1* | 12.124 | 1.050 | 1.67790 | 54.9 | 3.0 | 3.6 | 3.8 |
| 2* | 3.079 | 2.820 | — | — | — | — | — |
| 3* | −3.224 | 1.024 | 1.67790 | 54.9 | 3.0 | 3.6 | 3.8 |
| 4* | −4.556 | 0.288 | — | — | — | — | — |
| 5 (Stop) | inf | 0.411 | — | — | — | — | — |
| 6 | 13.306 | 3.306 | 1.59282 | 68.6 | −5.3 | −5.6 | −5.8 |
| 7 | −7.365 | 0.5972 | — | — | — | — | — |
| 8* | −97.626 | 3.150 | 1.49700 | 81.6 | −8.5 | −8.5 | −8.4 |
| 9* | −5.538 | 0.843 | — | — | — | — | — |
| 10 | −43.654 | 1.010 | 1.94595 | 18.0 | 4.4 | 5.2 | 5.8 |
| 11 | 13.675 | 3.195 | 1.72916 | 54.7 | 3.5 | 3.6 | 3.6 |
| 12 | −13.675 | 5.813 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 21

Example 7 Aspherical data

| Aspherical coefficient | S1 | S3 | S8 |
|---|---|---|---|
| K | 4.30424E+00 | −2.47789E−01 | 5.08958E+00 |
| A4 | −4.80302E−03 | 2.70115E−03 | −3.56854E−04 |
| A6 | 3.84469E−04 | 6.24933E−04 | −2.47839E−06 |
| A8 | −2.24104E−05 | −2.55711E−05 | −3.36811E−09 |
| A10 | 7.36898E−07 | 1.37015E−06 | 1.18140E−07 |
| A12 | −1.07321E−08 | −4.77750E−20 | −3.56197E−09 |

| Aspherical coefficient | S2 | S4 | S9 |
|---|---|---|---|
| K | −2.77229E−01 | 9.53479E−01 | 3.02557E−01 |
| A4 | −7.67037E−03 | 4.87262E−03 | 1.29440E−03 |
| A6 | 5.57497E−04 | 3.30834E−04 | 2.70470E−06 |
| A8 | −5.96034E−05 | 5.16973E−05 | 3.38631E−06 |
| A10 | 2.12330E−06 | −6.56930E−06 | −1.46180E−07 |
| A12 | −7.62078E−08 | 4.99898E−07 | 7.14504E−09 |
| A14 | −4.39123E−22 | — | — |
| A16 | −5.00261E−25 | — | — |

TABLE 22

Example 7 Lens data

| | |
|---|---|
| (Rr + \| Re \|)/Da | 2.23 |
| ((R1 + \| Re \|)/Dt | 1.46 |
| R1/(Dt + Db) | 0.52 |
| Rr/(Da + Db) | 0.74 |
| \| Re \|/Db | 2.35 |
| Rr/Re | −9.97 |
| Re/Da | −1.13 |
| Rr/Da | 1.10 |
| Dt/$f_{16}$ | 3.93 |
| Da/$f_{16}$ | 2.69 |
| Df/Dr | 0.41 |
| R1/Re | −0.89 |

TABLE 23

Example 8 Basic lens data

| i | Ri | Di | nd | vd | dn/dt (−20/0) | dn/dt (20/40) | dn/dt (60/80) |
|---|---|---|---|---|---|---|---|
| 1* | 12.125 | 1.050 | 1.67790 | 54.9 | 3.0 | 3.6 | 3.8 |
| 2* | 3.094 | 2.816 | — | — | — | — | — |
| 3* | −3.223 | 1.028 | 1.67790 | 54.9 | 3.0 | 3.6 | 3.8 |
| 4* | −4.555 | 0.293 | — | — | — | — | — |
| 5 (Stop) | inf | 0.363 | — | — | — | — | — |
| 6 | 15.036 | 3.284 | 1.59282 | 68.6 | −5.3 | −5.6 | −5.8 |
| 7 | −6.959 | 0.7565 | — | — | — | — | — |
| 8* | −150.040 | 3.193 | 1.49700 | 81.6 | −8.5 | −8.5 | −8.4 |
| 9* | −5.628 | 0.969 | — | — | — | — | — |
| 10 | −43.438 | 1.010 | 1.94595 | 18.0 | 4.4 | 5.2 | 5.8 |
| 11 | 13.542 | 3.215 | 1.72916 | 54.7 | 3.5 | 3.6 | 3.6 |
| 12 | −13.542 | 5.615 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 24

Example 8 Aspherical data

| Aspherical coefficient | S1 | S3 | S8 |
|---|---|---|---|
| K | 4.30180E+00 | −2.47862E−01 | 4.00844E+01 |
| A4 | −4.79955E−03 | 2.68819E−03 | −1.55696E−04 |
| A6 | 3.84546E−04 | 6.19525E−04 | −2.20325E−05 |
| A8 | −2.24082E−05 | −2.56838E−05 | 1.83920E−06 |
| A10 | 7.36962E−07 | 1.43489E−06 | 5.22121E−08 |
| A12 | −1.07304E−08 | −4.45380E−20 | −3.56197E−09 |

| Aspherical coefficient | S2 | S4 | S9 |
|---|---|---|---|
| K | −2.80306E−01 | 9.54079E−01 | 2.61942E−01 |
| A4 | −7.53680E−03 | 4.89740E−03 | 1.42831E−03 |
| A6 | 5.41708E−04 | 3.32398E−04 | −3.46538E−05 |
| A8 | −5.80483E−05 | 5.17339E−05 | 6.24158E−06 |
| A10 | 2.25790E−06 | −6.57262E−06 | −2.51153E−07 |
| A12 | −7.62078E−08 | 4.99898E−07 | 7.14504E−09 |

TABLE 24-continued

Example 8 Aspherical data

| A14 | −5.71867E−22 | — | — |
|---|---|---|---|
| A16 | −5.09114E−25 | — | — |

TABLE 25

Example 8 Lens data

| (Rr + │Re│)/Da | 2.30 |
|---|---|
| ((R1 + │Re│)/Dt | 1.43 |
| R1/(Dt + Db) | 0.51 |
| Rr/(Da + Db) | 0.83 |
| │Re│/Db | 2.41 |
| Rr/Re | −1.11 |
| Re/Da | −1.09 |
| Rr/Da | 1.21 |
| Dt/$f_{16}$ | 3.99 |
| Da/$f_{16}$ | 2.76 |
| Df/Dr | 0.41 |
| R1/Re | −0.90 |

TABLE 26

Example 9 Basic lens data

| i | Ri | Di | nd | vd | dn/dt (−20/0) | dn/dt (20/40) | dn/dt (60/80) |
|---|---|---|---|---|---|---|---|
| 1* | 12.026 | 1.050 | 1.67790 | 54.9 | 3.0 | 3.6 | 3.8 |
| 2* | 3.039 | 2.896 | — | — | — | — | — |
| 3* | −3.222 | 1.109 | 1.67790 | 54.9 | 3.0 | 3.6 | 3.8 |
| 4* | −4.548 | 0.120 | — | — | — | — | — |
| 5 (Stop) | inf | 0.282 | — | — | — | — | — |
| 6 | 13.451 | 3.424 | 1.59282 | 68.6 | −5.3 | −5.6 | −5.8 |
| 7 | −6.686 | 0.4584 | — | — | — | — | — |
| 8* | −45.276 | 3.150 | 1.49700 | 81.6 | −8.5 | −8.5 | −8.4 |
| 9* | −5.264 | 1.024 | — | — | — | — | — |
| 10 | −35.926 | 1.655 | 1.94595 | 18.0 | 4.4 | 5.2 | 5.8 |
| 11 | 13.391 | 3.350 | 1.72916 | 54.7 | 3.5 | 3.6 | 3.6 |
| 12 | −13.391 | 5.160 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 27

Example 9 Aspherical data

| Aspherical coefficient | S1 | S3 | S8 |
|---|---|---|---|
| K | 4.22264E+00 | −3.00235E−01 | −2.07727E+01 |
| A4 | −4.75795E−03 | 2.93612E−03 | −1.52984E−04 |
| A6 | 3.81038E−04 | 6.51994E−04 | −1.84081E−04 |
| A8 | −2.24766E−05 | −3.69535E−05 | 1.35972E−06 |
| A10 | 7.36527E−07 | 1.50154E−06 | 8.38450E−08 |
| A12 | −1.06438E−08 | −4.45635E−20 | −3.56197E−09 |

| Aspherical coefficient | S2 | S4 | S9 |
|---|---|---|---|
| K | −2.84777E−01 | 9.61152E−01 | 2.04493E−01 |
| A4 | −7.63375E−03 | 5.30297E−03 | 1.39164E−03 |
| A6 | 5.74325E−04 | 3.44912E−04 | 1.35222E−05 |
| A8 | −5.36904E−05 | 5.13324E−05 | 2.36810E−06 |
| A10 | 1.29625E−06 | −6.72830E−06 | −9.14101E−08 |
| A12 | −7.62078E−08 | 4.99898E−07 | 7.14504E−09 |
| A14 | −5.71805E−22 | — | — |
| A16 | −5.09528E−25 | — | — |

TABLE 28

Example 9 Lens data

| | |
|---|---|
| (Rr + \| Re \|)/Da | 2.06 |
| ((R1 + \| Re \|)/Dt | 1.37 |
| R1/(Dt + Db) | 0.51 |
| Rr/(Da + Db) | 0.74 |
| \| Re \|/Db | 2.60 |
| Rr/Re | −1.00 |
| Re/Da | −1.03 |
| Rr/Da | 1.03 |
| $Dt/f_{16}$ | 4.12 |
| $Da/f_{16}$ | 2.90 |
| Df/Dr | 0.39 |
| R1/Re | −0.90 |

TABLE 29

Example 10 Basic lens data

| i | Ri | Di | nd | νd | dn/dt (−20/0) | dn/dt (20/40) | dn/dt (60/80) |
|---|---|---|---|---|---|---|---|
| 1* | 12.129 | 1.050 | 1.67790 | 54.9 | 3.0 | 3.6 | 3.8 |
| 2* | 3.052 | 2.818 | — | — | — | — | — |
| 3* | −3.224 | 1.075 | 1.67790 | 54.9 | 3.0 | 3.6 | 3.8 |
| 4* | −4.554 | 0.198 | — | — | — | — | — |
| 5 (Stop) | inf | 0.180 | — | — | — | — | — |
| 6 | 12.610 | 3.150 | 1.59282 | 68.6 | −5.3 | −5.6 | −5.8 |
| 7 | −8.407 | 0.4057 | — | — | — | — | — |
| 8* | −26.942 | 3.150 | 1.49700 | 81.6 | −8.5 | −8.5 | −8.4 |
| 9* | −4.867 | 1.976 | — | — | — | — | — |
| 10 | −82.480 | 1.299 | 1.94595 | 18.0 | 4.4 | 5.2 | 5.8 |
| 11 | 11.671 | 3.690 | 1.72916 | 54.7 | 3.5 | 3.6 | 3.6 |
| 12 | −11.671 | 4.864 | — | — | — | — | — |
| 13 (CG) | inf | 0.500 | 1.51633 | 64.1 | — | — | — |
| 14 (CG) | inf | 0.170 | — | — | — | — | — |
| 15 (Imaging plane) | inf | — | — | — | — | — | — |

TABLE 30

Example 10 Aspherical data

| Aspherical coefficient | S1 | S3 | S8 |
|---|---|---|---|
| K | 4.29057E+00 | −2.54173E−01 | 3.99939E+01 |
| A4 | −4.80741E−03 | 2.83272E−03 | −5.29283E−05 |
| A6 | 3.84096E−04 | 6.38655E−04 | −3.66523E−06 |
| A8 | −2.24218E−05 | −2.57029E−05 | 2.10320E−06 |
| A10 | 7.36559E−07 | 1.25318E−06 | 1.63385E−07 |
| A12 | −1.07423E−08 | −6.32165E−20 | −3.56197E−09 |

| Aspherical coefficient | S2 | S4 | S9 |
|---|---|---|---|
| K | −2.90300E−01 | 9.53329E−01 | −4.67797E−02 |
| A4 | −7.74870E−03 | 4.80524E−03 | 1.12988E−03 |
| A6 | 5.93734E−04 | 3.31737E−04 | 2.18514E−05 |
| A8 | −5.99627E−05 | 5.20035E−05 | 1.57789E−06 |
| A10 | 1.99771E−06 | −6.53978E−06 | −4.46126E−08 |
| A12 | −7.62078E−08 | 4.99900E−07 | 7.14504E−09 |
| A14 | −4.27663E−22 | — | — |
| A16 | −4.81678E−25 | — | — |

TABLE 31

Example 10 Lens data

| | |
|---|---|
| (Rr + \| Re \|)/Da | 1.78 |
| ((R1 + \| Re \|)/Dt | 1.25 |
| R1/(Dt + Db) | 0.51 |
| Rr/(Da + Db) | 0.68 |
| \| Re \|/Db | 2.40 |
| Rr/Re | −1.08 |
| Re/Da | −0.85 |
| Rr/Da | 0.92 |
| $Dt/f_{16}$ | 4.22 |
| $Da/f_{16}$ | 3.04 |
| Df/Dr | 0.37 |
| R1/Re | −1.04 |

It is to be noted that various modifications can be made to the above embodiment and examples. For example, in addition to the imaging lens 10 in the examples above, it is possible to configure an imaging lens equivalent in shape, arrangement, and imaging performance to the imaging lens 10, by changing the curvature radius, the refractive index, presence of an infrared ray cut coat, surface with an infrared ray cut coat, and other lens data.

10: imaging lens
20: imaging apparatus
L1: first lens
L2: second lens
L3: third lens
L4: fourth lens
L5: fifth lens
L6: sixth lens
ST: aperture stop
CG: cover glass
IP: imaging plane
LT: light
REF1: first reflection
REF2: second reflection

What is claimed is:

1. An imaging lens comprising, in order from an object side:
    a front group having negative power;
    an aperture stop; and
    a rear group having positive power,
    wherein in the front group, a first lens surface closest to the object side has a convex shape toward the object side,
    wherein in the rear group, a second lens surface closest to the object side has a convex shape toward the object side, a third lens surface closest to an image side has a convex shape toward the image side, and the third lens surface has a coating that filters infrared wavelength,
    wherein a curvature radius of the second lens surface is represented by Rr, a curvature radius of the third lens surface is represented by Re, a distance from the second lens surface to the third lens surface on an optical axis is represented by Da, and the following condition (1) is satisfied:

$$1.6 < (Rr + |Re|)/Da < 2.3, \qquad (1)$$

wherein the front group includes, in the order from the object side,
        a concave meniscus-shaped first lens having the first lens surface, and
        a concave meniscus-shaped second lens, wherein the concave meniscus-shaped second lens is arranged with a convex surface facing the image side,
    wherein the rear group includes, in the order from the object side,
        a third lens having the second lens surface,
        a fourth lens, and
        a cemented lens, and
    wherein the third lens, the fourth lens, and the cemented lens all have positive power.

2. The imaging lens according to claim 1,
    wherein the cemented lens is composed of, in the order from the object side,
        a fifth lens, which is a concave lens, and
        a sixth lens, which is a convex lens, and
    wherein the sixth lens has the third lens surface.

3. The imaging lens according to claim 1,
    wherein a curvature radius of the first lens surface is represented by R1, the curvature radius of the third lens surface is represented by Re, a distance from the first lens surface to the third lens surface on the optical axis is represented by Dt, and the following condition (2) is satisfied:

$$1.20 \le (R1 + |Re|)/Dt \le 1.46. \qquad (2)$$

4. An imaging apparatus comprising, in order from an object side:
    an imaging lens; and
    a flat plate-shaped cover glass,
    wherein the imaging lens comprises, in the order from the object side:
        a front group having negative power;
        an aperture stop; and
        a rear group having positive power,
    wherein in the front group, a first lens surface closest to the object side has a convex shape toward the object side,
    wherein in the rear group, a second lens surface closest to the object side has a convex shape toward the object side, a third lens surface closest to an image side has a convex shape toward the image side, and the third lens surface has a coating that filters infrared wavelength,
    wherein a curvature radius of the second lens surface is represented by Rr, a curvature radius of the third lens surface is represented by Re, a distance from the second lens surface to the third lens surface on an optical axis is represented by Da, and the following condition (1) is satisfied:

$$1.6 < (Rr + |Re|)/Da < 2.3, \qquad (1)$$

wherein the front group includes, in the order from the object side,
        a concave meniscus-shaped first lens having the first lens surface, and
        a concave meniscus-shaped second lens, wherein the concave meniscus-shaped second lens is arranged with a convex surface facing the image side,
    wherein the rear group includes, in the order from the object side,
        a third lens having the second lens surface,
        a fourth lens, and
        a cemented lens, and
    wherein the third lens, the fourth lens, and the cemented lens all have positive power.

5. The imaging apparatus according to claim 4,
    wherein the curvature radius of the first lens surface is represented by R1, the distance from the first lens surface to the third lens surface on the optical axis is represented by Dt, the distance from the third lens surface to the object side of the flat plate-shaped cover glass on the optical axis is represented by Db, and the following condition (3) is satisfied:

$$0.50 \le R1/(Dt + Db) \le 0.53. \qquad (3)$$

6. The imaging apparatus according to claim 4,
wherein the curvature radius of the second lens surface is represented by Rr, the distance from the second lens surface to the third lens surface on the optical axis is represented by Da, the distance from the third lens surface to the object side of the flat plate-shaped cover glass on the optical axis is represented by Db, and the following condition (4) is satisfied:

$$0.66 \leq Rr/(Da + Db) \leq 0.83. \tag{4}$$

7. The imaging apparatus according to claim 4,
wherein the curvature radius of the third lens surface is represented by Re, the distance from the third lens surface to the object side of the flat plate-shaped cover glass on the optical axis is represented by Db, and the following condition (5) is satisfied:

$$2.28 \leq |Re|/Db \leq 2.88. \tag{5}$$

\* \* \* \* \*